US011843791B2

(12) United States Patent
Francois et al.

(10) Patent No.: US 11,843,791 B2
(45) Date of Patent: Dec. 12, 2023

(54) CHROMA PROCESSING FOR VIDEO ENCODING AND DECODING

(71) Applicant: InterDigital Madison Patent Holdings, SAS, Paris (FR)

(72) Inventors: Edouard Francois, Bourg des Comptes (FR); Remi Jullian, Cesson-Sevigne (FR); Franck Hiron, Chateaubourg (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 214 days.

(21) Appl. No.: 17/608,416

(22) PCT Filed: Apr. 28, 2020

(86) PCT No.: PCT/US2020/030256
§ 371 (c)(1),
(2) Date: Nov. 2, 2021

(87) PCT Pub. No.: WO2020/226944
PCT Pub. Date: Nov. 12, 2020

(65) Prior Publication Data
US 2022/0337848 A1 Oct. 20, 2022

(30) Foreign Application Priority Data

May 3, 2019 (EP) ..................................... 19305565
Jun. 18, 2019 (EP) ..................................... 19305773
(Continued)

(51) Int. Cl.
*H04N 19/30* (2014.01)
*H04N 19/132* (2014.01)
(Continued)

(52) U.S. Cl.
CPC ........... *H04N 19/30* (2014.11); *H04N 19/132* (2014.11); *H04N 19/167* (2014.11);
(Continued)

(58) Field of Classification Search
CPC .... H04N 19/30; H04N 19/132; H04N 19/167; H04N 19/172; H04N 19/186;
(Continued)

(56) References Cited

U.S. PATENT DOCUMENTS

2018/0020241 A1   1/2018  Li et al.
2019/0028702 A1   1/2019  Yu et al.
(Continued)

FOREIGN PATENT DOCUMENTS

WO    WO 2019006300 A1    1/2019

OTHER PUBLICATIONS

Joint Video Experts Team (JVET) of ITU-T SG 16 WP 3 and ISO/IEC JTC 1/SC 29/WG 11, JVET-M0119, 13th Meeting: Marrakech, MA, Jan. 9-18, 2019 (Year: 2019).*
(Continued)

*Primary Examiner* — Marnie A Matt
(74) *Attorney, Agent, or Firm* — Smadar Gefen

(57) ABSTRACT

Encoding or decoding picture information can involve determining a first scaling factor varying with a first granularity to scale a chroma prediction residual associated with chroma information included in the picture information; determining a second scaling factor varying with a second granularity finer than the first granularity; scaling the chroma prediction residual based on a combination of the first scaling factor and the second scaling factor to provide a scaled chroma prediction residual with the second granularity; and encoding or decoding at least a portion of the picture information based on the scaled chroma prediction residual.

23 Claims, 18 Drawing Sheets

(30) Foreign Application Priority Data

Jul. 2, 2019 (EP) .................................... 19305901
Jul. 5, 2019 (EP) .................................... 19290049

(51) Int. Cl.
H04N 19/167 (2014.01)
H04N 19/172 (2014.01)
H04N 19/186 (2014.01)
H04N 19/70 (2014.01)

(52) U.S. Cl.
CPC ......... *H04N 19/172* (2014.11); *H04N 19/186* (2014.11); *H04N 19/70* (2014.11)

(58) Field of Classification Search
CPC ...... H04N 19/70; H04N 19/117; H04N 19/46; H04N 19/82; H04N 19/50; H04N 19/80
USPC .................................................... 375/240.08
See application file for complete search history.

(56) References Cited

U.S. PATENT DOCUMENTS

| 2019/0068969 | A1 | 2/2019 | Rusanovskyy et al. | |
|---|---|---|---|---|
| 2020/0267392 | A1* | 8/2020 | Lu | H04N 19/182 |
| 2023/0021624 | A1* | 1/2023 | Lu | H04N 19/463 |

OTHER PUBLICATIONS

F. Bossen et al., "Video Coding Using a Simplified Block Structure and Advanced Coding Techniques," in IEEE Transactions on Circuits and Systems for Video Technology, vol. 20, No. 12, pp. 1667-1675, Dec. 2010, doi: 10.1109/TCSVT.2010.2092616. (Year: 2010).*

Telecom, "High efficiency video coding", Series H: Audiovisual and Multimedia Systems. Infrastructure of audiovisual services—Coding of moving video, Recommendation ITU-T H.265, Oct. 2014, 540 pages.

Chen et al., "Algorithm description for Versatile Video Coding and Test Model 4 (VTM 4)", Joint Video Experts Team (JVET) of ITU-T SG 16 WP 3 and ISO/IEC JTC 1/SC 29/WG 11, Document: JVET-M1002-v2, 13th Meeting, Marrakech, Morocco, Jan. 9, 2019, 62 pages.

Lu et al., "CE12: Mapping functions (test CE12-1 and CE12-2)", Joint Video Experts Team (JVET) of ITU-T SG 16 WP3 and ISO/IEC JTC 1/SC 29/WG 11, Document: JVET-M0427-v2, 13th Meeting, Marrakech, Morroco, Jan. 9, 2019, 15 pages.

Bross, et al., "Versatile Video Coding (Draft 4)", Joint Video Experts Team (JVET) of ITU-T SG 16 WP 3 and ISO/IEC JTC 1/SC 29/WG 11, Document JVET-M1001-v7, 13th Meeting: Marrakech, Morocco, Jan. 9, 2019, 300 pages.

Bross et al., "Versatile Video Coding (Draft 5)", Joint Video Experts Team (JVET) of ITU-T SG 16 WP 3 and ISO/IEC JTC 1/SC 29/WG 11, Document: JVET-N1001-v9, 14th Meeting: Geneva, Switzerland, Mar. 19, 2019, 405 pages.

Ye et al., "BoG report on CE7 related contributions", Joint Video Experts Team (JVET) of ITU-T SG 16 WP 3 and 1 ISO/IEC JTC 1/SC 29/WG 11, Document: JVET-M0891-v1, 13th Meeting: Marrakech, Morroco, Jan. 9, 2019, 14 pages.

* cited by examiner

Example of chroma QP derivation

Example of Chroma Decoding based on a Scaling Factor Index Signaling

Example of chroma decoding based on
a scaling factor derived from a fine grain signaled dQP Example of chroma decoding
based on a scaling factor derived from a fine grain signaled dQP Example of a chroma encoding process using a chroma scaling factor index Example of chroma encoding process using a chroma scaling factor index, limiting index value redundancies Example of chroma encoding based on a fine grain chroma delta QP

CHROMA PROCESSING FOR VIDEO ENCODING AND DECODING

CROSS REFERENCE TO RELATED APPLICATIONS

This application is a U.S. National Stage Application under 35 U.S.C. 371 of International Patent Application No. PCT/US2020/030256, filed Apr. 28, 2020, which is incorporated herein by reference in its entirety.

This application claims the benefit of European Patent Application Nos. 19305565, filed May 3, 2019; U.S. Pat. No. 19,290,049, filed Jul. 5, 2019; U.S. Pat. No. 19,305,901, filed Jul. 2, 2019; and U.S. Pat. No. 19,305,773, filed Jun. 18, 2019, each of which is incorporated herein by reference in its entirety.

TECHNICAL FIELD

The present disclosure involves video encoding and decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original picture block and the predicted picture block, often denoted as prediction errors or prediction residuals, are transformed, quantized and entropy coded. To reconstruct the video, the compressed data is decoded by inverse processes corresponding to the prediction, transform, quantization and entropy coding.

SUMMARY

In general, an example of an embodiment described herein relates to video encoding and decoding using chroma residual scaling.

In general, another example of an embodiment involves a method for encoding picture information wherein the method comprises: determining a first scaling factor varying with a first granularity to scale a chroma prediction residual associated with chroma information included in the picture information; determining a second scaling factor varying with a second granularity finer than the first granularity; scaling the chroma prediction residual based on a combination of the first scaling factor and the second scaling factor to provide a scaled chroma prediction residual with the second granularity; and encoding at least a portion of the picture information based on the scaled chroma prediction residual.

In general, another example of an embodiment involves a method for decoding picture information, wherein the method comprises: determining a first scaling factor varying with a first granularity to scale a chroma prediction residual associated with chroma information included in the picture information; determining a second scaling factor varying with a second granularity finer than the first granularity; scaling the chroma prediction residual based on a combination of the first scaling factor and the second scaling factor to provide a scaled chroma prediction residual with the second granularity; and decoding at least a portion of the picture information based on the scaled chroma prediction residual.

In general, another example of an embodiment involves apparatus for encoding picture information comprising one or more processors configured to: determine a first scaling factor varying with a first granularity to scale a chroma prediction residual associated with chroma information included in the picture information; determine a second scaling factor varying with a second granularity finer than the first granularity; scale the chroma prediction residual based on a combination of the first scaling factor and the second scaling factor to provide a scaled chroma prediction residual with the second granularity; and encode at least a portion of the picture information based on the scaled chroma prediction residual.

In general, another example of an embodiment involves apparatus for decoding picture information comprising one or more processors configured to: determine a first scaling factor varying with a first granularity to scale a chroma prediction residual associated with chroma information included in the picture information; determine a second scaling factor varying with a second granularity finer than the first granularity; scale the chroma prediction residual based on a combination of the first scaling factor and the second scaling factor to provide a scaled chroma prediction residual with the second granularity; and decode at least a portion of the picture information based on the scaled chroma prediction residual.

In general, another example of an embodiment involves a method for encoding picture information comprising: determining a first scaling factor varying with a first granularity to scale a chroma prediction residual associated with chroma information included in the picture information; combining the first scaling factor with a second scaling factor to provide a combined scaling factor having a second granularity finer than the first granularity; scaling the chroma prediction residual based on the combined scaling factor to provide a scaled chroma prediction residual varying with the second granularity; and encoding at least a portion of the picture information based on the scaled chroma prediction residual.

In general, another example of an embodiment involves a method for decoding picture information comprising: determining a first scaling factor varying with a first granularity to scale a chroma prediction residual associated with chroma information included in the picture information; combining the first scaling factor with a second scaling factor to provide a combined scaling factor having a second granularity finer than the first granularity; scaling the chroma prediction residual based on the combined scaling factor to provide a scaled chroma prediction residual varying with the second granularity; and decoding at least a portion of the picture information based on the scaled chroma prediction residual.

In general, another example of an embodiment involves apparatus for encoding picture information comprising one or more processors configured to: determine a first scaling factor varying with a first granularity to scale a chroma prediction residual associated with chroma information included in the picture information; combine the first scaling factor with a second scaling factor to provide a combined scaling factor having a second granularity finer than the first granularity; scale the chroma prediction residual based on the combined scaling factor to provide a scaled chroma prediction residual varying with the second granularity; and encode at least a portion of the picture information based on the scaled chroma prediction residual.

In general, another example of an embodiment involves apparatus for decoding picture information comprising one or more processors configured to: determine a first scaling factor varying with a first granularity to scale a chroma prediction residual associated with chroma information included in the picture information; combine the first scaling factor with a second scaling factor to provide a combined scaling factor having a second granularity finer than the first granularity; scaling the chroma prediction residual based on the combined scaling factor to provide a scaled chroma prediction residual varying with the second granularity; and decoding at least a portion of the picture information based on the scaled chroma prediction residual.

Various modifications and embodiments are envisioned as explained below that can provide improvements to a video encoding and/or decoding system including but not limited to one or more of increased compression efficiency and/or coding efficiency and/or processing efficiency and/or decreased complexity.

The above presents a simplified summary of the subject matter in order to provide a basic understanding of some aspects of the present disclosure. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description provided below.

BRIEF DESCRIPTION OF THE DRAWINGS

The present disclosure may be better understood by considering the detailed description below in conjunction with the accompanying figures, in which.

It should be understood that the drawings are for purposes of illustrating examples of various aspects and embodiments and are not necessarily the only possible configurations. Throughout the various figures, like reference designators refer to the same or similar features.

DETAILED DESCRIPTION

In general, at least one embodiment described herein relates to usage of chroma residual scaling. For example, chroma residual scaling involves scaling or inverse scaling a chroma prediction residual signal in a chroma block by a scaling factor that depends on luma samples that can be collocated or neighboring the chroma block. In a decoder, decoding occurs based on a scaling factors table that is decoded, and for each chroma block, the index in the table is derived from luma samples collocated or neighboring the chroma block. As a result, a luma-to-chroma dependency exists that can generate latency for processing chroma blocks. At least one embodiment addresses reducing any adverse effect that might be associated with the described chroma-block processing latency.

Figure 1:
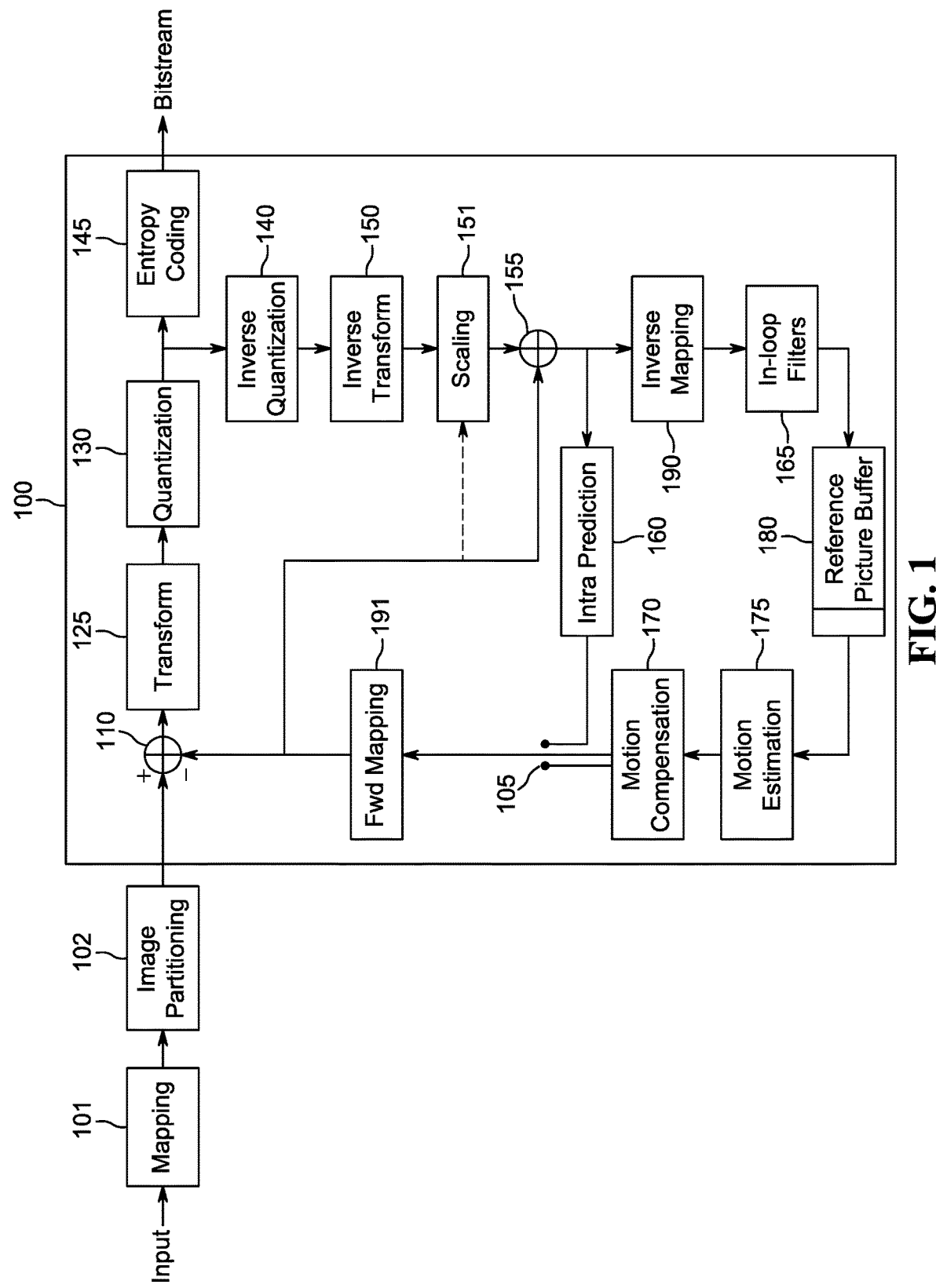
FIG. 1 provides a block diagram depicting an example of an embodiment of a video encoder.

Turning now to the figures, FIG. 1 illustrates an example of a video encoder 100, such as an HEVC encoder. HEVC is a compression standard developed by Joint Collaborative Team on Video Coding (JCT-VC) (see, e.g., "ITU-T H.265 TELECOMMUNICATION STANDARDIZATION SECTOR OF ITU (October 2014), SERIES H: AUDIOVISUAL AND MULTIMEDIA SYSTEMS, Infrastructure of audio-visual services—Coding of moving video, High efficiency video coding, Recommendation ITU-T H.265"). FIG. 1 may also illustrate an encoder in which improvements are made to the HEVC standard or an encoder employing technologies similar to HEVC, such as an encoder based on or improved upon JEM (Joint Exploration Model) under development by the Joint Video Experts Team (JVET), e.g., that associated with the development effort designated Versatile Video Coding (VVC).

In the present application, the terms "reconstructed" and "decoded" may be used interchangeably, the terms "pixel" and "sample" may be used interchangeably, and the terms "picture" and "frame" may be used interchangeably. Usually, but not necessarily, the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock and a partition as specified in H.264/AVC or other video coding standards, and more generally to refer to an array of data of various sizes.

In encoder 100 in FIG. 1, a picture is encoded by the encoder elements as described below. The picture information to be encoded is provided at the input and undergoes mapping (101) and image partitioning (102). The mapping (101) typically applies per sample and can involve applying a 1D-function to the input sample values to convert them into other sample values. The 1D-function for instance aims at expanding the sample value range and allows getting a better distributing the codewords over the codeword range. The image partitioning (102) splits the image into blocks of different size and shape, in order to optimize the rate-distortion trade-off. The mapping and partitioning enable processing the picture information in units of CUs as described above. Each CU is encoded using either an intra or inter mode. When a CU is encoded in an intra mode, the encoder performs intra prediction (160). In an inter mode, motion estimation (175) and compensation (170) are performed. The encoder decides (105) which one of the intra mode or inter mode to use for encoding the CU and indicates the intra/inter decision by a prediction mode flag. The intra or inter prediction decision (105) is followed by forward mapping (191) to produce a predicted block. In general, forward mapping (191) is of the same spirit as the mapping (101) and can be complementary to the mapping. Prediction residuals are calculated by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140), inverse transformed (150), and scaled (151) to decode prediction residuals. The scaling (151) basically corresponds to multiplying the prediction residual samples by a scaling factor. More elaborated operations can anyway be considered, such as a low pass filtering combined with the scaling. Combining (155) the decoded prediction residuals and the predicted block, an image block is reconstructed. Inverse mapping (190) and in-loop filters (165) are applied to the reconstructed picture, for example, to perform deblocking/SAO (Sample Adaptive Offset) filtering to reduce encoding artifacts. The inverse mapping is the inverse of the forward mapping (191). The filtered image is stored at a reference picture buffer (180).

Figure 2:
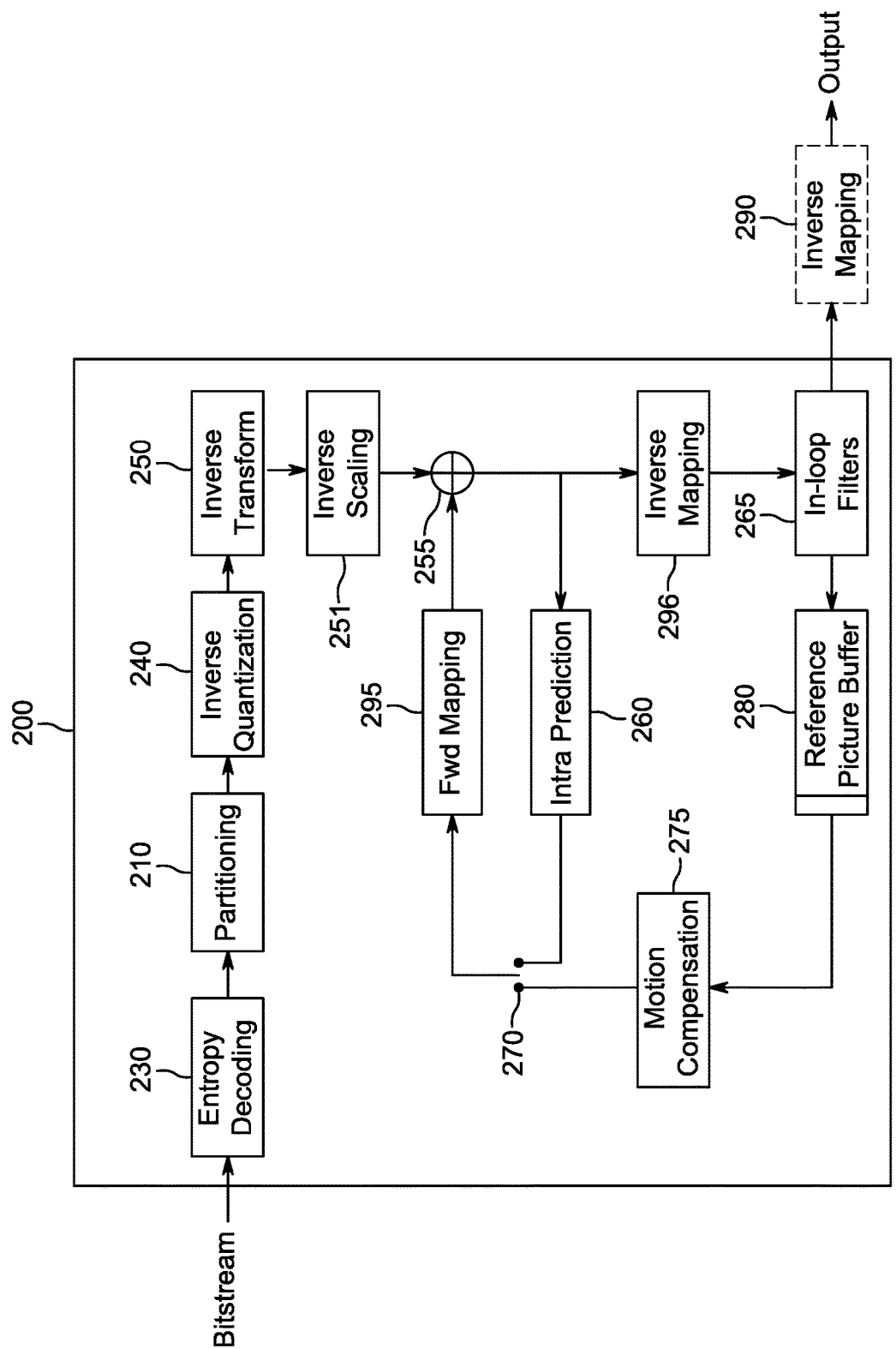
FIG. 2 provides a block diagram depicting an example of an embodiment of a video decoder.

FIG. 2 illustrates a block diagram of an example of a video decoder 200, such as an HEVC decoder. In the example decoder 200, a signal or bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a decoder based on or improved upon JEM.

In particular, the input of the decoder includes a video signal or bitstream that can be generated by a video encoder such as video encoder 100 of FIG. 1. The signal or bitstream is first entropy decoded (230) followed by partitioning (210) to obtain transform coefficients, motion vectors, and other coded information. The partitioning (210) divides the image into blocks and different size and shape based on the decoded data. The transform coefficients are de-quantized (240), inverse transformed (250), and scaled (251) to produce decoded prediction residuals. The inverse scaling (251) is the same as (190) of the encoder, and inverts the scaling process (151). Combining (255) the decoded prediction residuals and the predicted block, an image block is reconstructed. The predicted block can be obtained (270) from intra prediction (260) or motion-compensated prediction (i.e., inter prediction) (275) and undergoes forward mapping (295) before being combined (255) with the prediction residuals. The forward mapping (295) is the same as (191) of the encoder. Advanced Motion Vector Prediction (AMVP) and merge mode techniques may be used to derive motion vectors for motion compensation, which may use interpolation filters to calculate interpolated values for sub-integer samples of a reference block. Inverse mapping (296) and in-loop filters (265) are applied to the reconstructed image. Inverse mapping (296) is the inverse of (190) of the encoder. The filtered image is stored at a reference picture buffer (280). Inverse mapping (290) can be applied to the filtered image (265) to produce output picture information. The inverse mapping (290) is the inverse process of (101) of the encoder.

Figure 3:
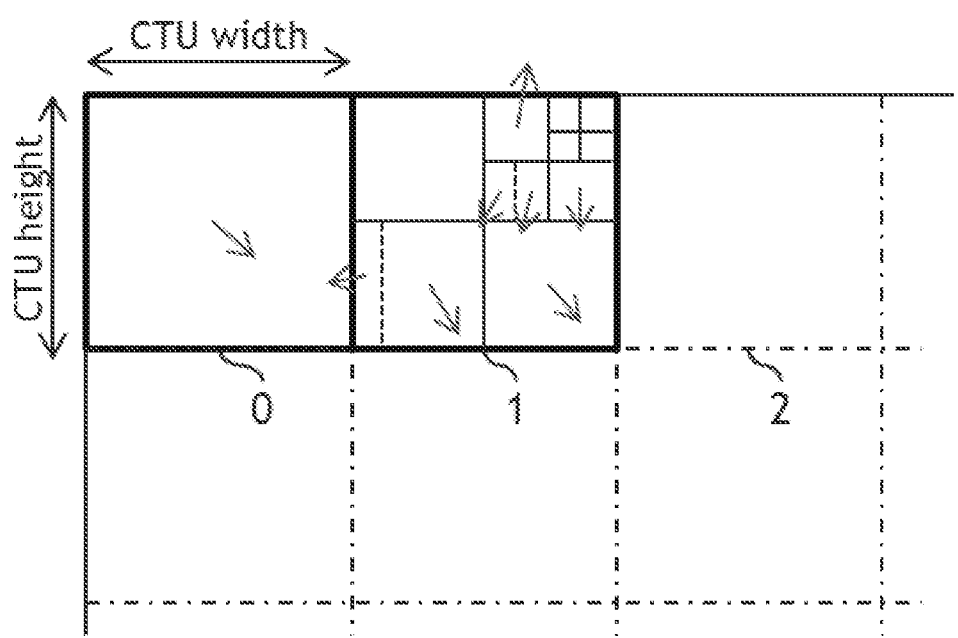
FIG. 3 illustrates a Coding Tree Unit (CTU) and Coding Tree concepts that can be used to represent a compressed picture.

In the HEVC video compression standard, motion compensated temporal prediction is employed to exploit the redundancy that exists between successive pictures of a video. To do so, a motion vector is associated to each prediction unit (PU). Each Coding Tree Unit (CTU) is represented by a Coding Tree (CT) in the compressed domain. This is a quad-tree division of the CTU, where each leaf is called a Coding Unit (CU) as illustrated in FIG. 3.

Figure 4:
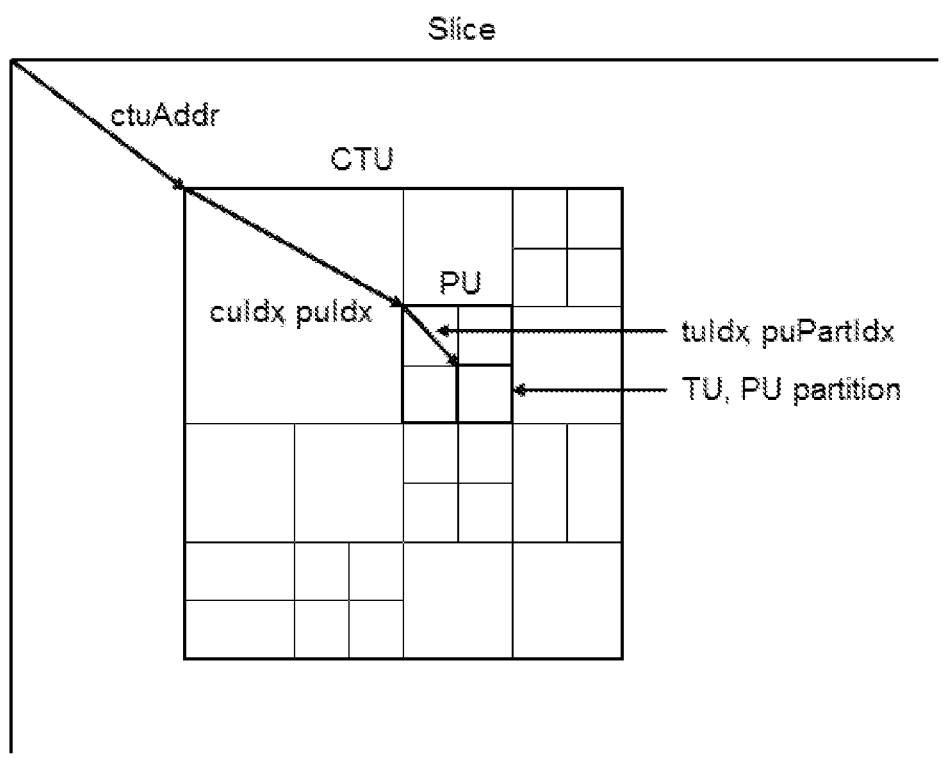
FIG. 4 illustrates a Coding Tree Unit (CTU) and division of a CTU into Coding Units (CU), Prediction Units (PU) and Transform Units (TU)

Each CU is then given some Intra or Inter prediction parameters or prediction information (Prediction Info). To do so, it is spatially partitioned into one or more Prediction Units (PUs), each PU being assigned some prediction information. The Intra or Inter coding mode is assigned on the CU level as illustrated in FIG. 4 which shows an example of division of a Coding Tree Unit into Coding Units, Prediction Units and Transform Units. For coding a CU, a prediction block or prediction unit (PU) is built from neighboring reconstructed samples (intra prediction) or from previously reconstructed pictures stored in the Decoded Pictures Buffer (DPB) (inter-prediction). Next, the residual samples calculated as the difference between original samples and PU samples, are transformed and quantized.

Figure 5:
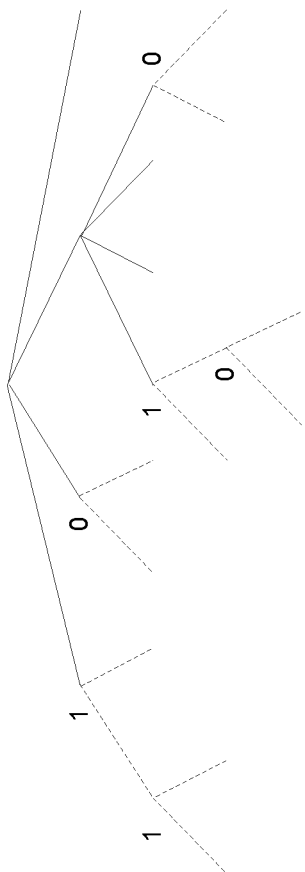
FIG. 5 illustrates an example of Quad-Tree plus Binary-Tree (QTBT) representation.
Figure 5:
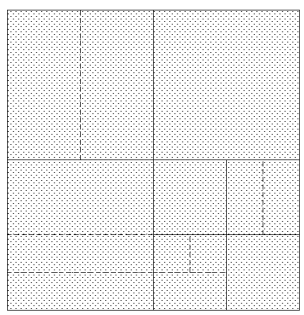

Codecs and video compression tools other than HEVC, e.g. the Joint Exploration Model (JEM) and that developed by JVET (Joint Video Exploration Team) group in the Versatile Video Coding (VVC) reference software known as VVC Test Model (VTM), may provide for a CTU representation in the compressed domain that represents picture data in a more flexible way in the compressed domain. A more flexible representation of the coding tree can provide increased compression efficiency compared to an approach such as the CU/PU/TU arrangement of the HEVC standard. One example of a more flexible representation is a Quad-Tree plus Binary-Tree (QTBT) coding tool. An example of a representation such as QTBT is illustrated in FIG. 5 which shows a coding tree having coding units that can be split both in a quad-tree and in a binary-tree fashion. The splitting of a coding unit can be decided on the encoder side based on an optimization procedure, e.g., a rate distortion optimization procedure, that determines the QTBT representation of the CTU with minimal rate distortion cost.

Figure 6:
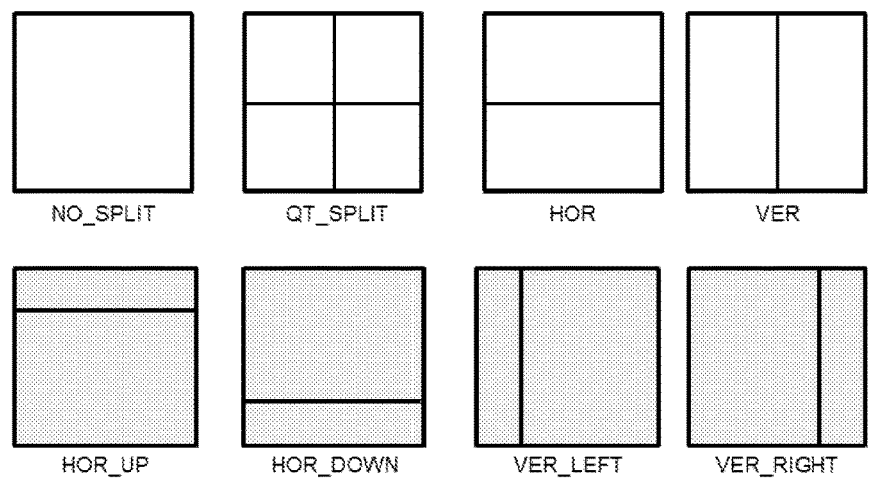
FIG. 6 illustrates Coding Unit (CU) partitions that may be used in an extended QTBT representation of a CTU.
Figure 7:
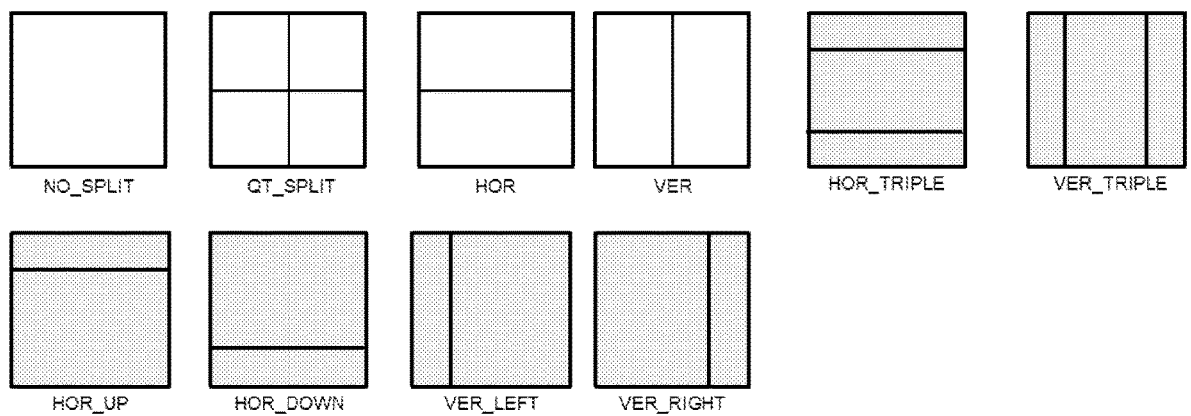
FIG. 7 illustrates an extended set of CU split modes including the split modes of FIG. 6 plus horizontal and vertical triple-tree split modes.

In the QTBT technology, a CU can have either square or rectangular shape. The size of a coding unit may be a power of 2 and, for example, have a range from 4 to 128. In addition to this variety of rectangular shapes for a coding unit, a representation of a CTU such as QTBT can have the following characteristics that differ from an approach such as HEVC:

- The QTBT decomposition of a CTU is made of two stages: first the CTU is split in a quad-tree fashion, then each quad-tree leaf can be further divided in a binary fashion. This is illustrated on the right side of FIG. 5 where solid lines represent the quad-tree decomposition phase and dashed lines represent the binary decomposition that is spatially embedded in the quad-tree leaves.
- In intra slices, the Luma and Chroma block partitioning structure is separated, and decided independently.
- CU partitioning into prediction units or transform units is not employed, i.e., each CU is systematically made of a single prediction unit (2N×2N prediction unit partition type) and single transform unit (no division into a transform tree).
- Some other CU binary or triple tree partitioning may also be employed in the representation of the CTU's coding tree, as illustrated in FIGS. 6 and 7.
- For example, FIGS. 6 and 7 illustrate additional split or partitioning modes provided in the VVC (Versatile Video Coding) video compression standard. The additional split modes include asymmetric binary and tree (ABT) split modes. ABT split modes can involve a rectangular coding unit with size (w,h) (width and height) being split through one of the asymmetric binary splitting modes such as HOR_UP (horizontal-up) that, as shown in FIGS. 6 and 7, would lead to two sub-coding units with respective rectangular sizes $$\left(w, \frac{h}{4}\right) \text{ and } \left(w, \frac{3h}{4}\right).$$

Figure 8:
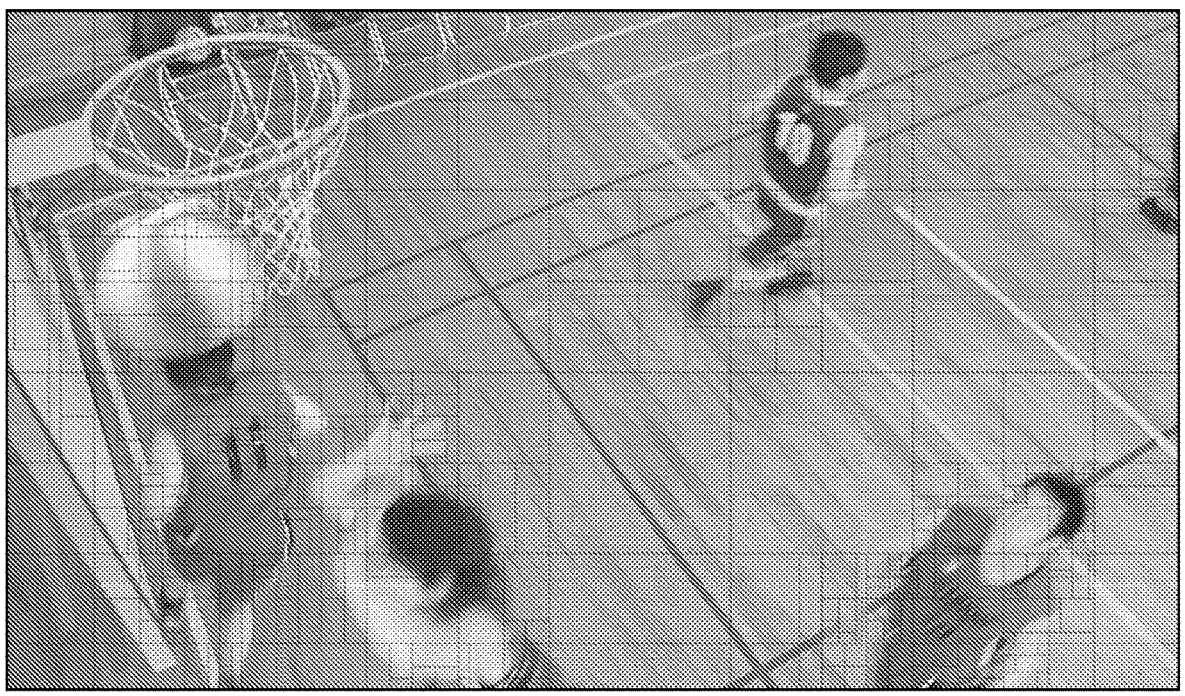
FIG. 8 provides an example of a picture and coding structures selected to encode the picture including Quad-Tree partitions or decompositions of CTUs into which are embedded various split modes including Symmetrical Binary Tree, Asymmetric Binary Tree and Triple Tree decompositions.

In addition, the so-called triple (or ternary) tree (TT) partitioning of a CU may be used, leading to possible additional partitions illustrated on the right side of FIG. 7. Triple tree involves splitting a CU into three sub-CU with size, for example, (¼,½,¼) relative to the parent CU, in the considered orientation. FIG. 8 illustrates an example of application of various split modes or coding structures to encode an example of a picture. The structures selected and illustrated in FIG. 8 include Quad-Tree partitions or decompositions of CTUs into which are embedded various split modes including Symmetrical Binary Tree, Asymmetric Binary Tree and Triple Tree decompositions.

After the splitting, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction. Application of an expanded range of coding structures or topologies such as those described above and shown in FIGS. 6 and 7 have been shown to provide improvements of coding efficiency. In particular, significant coding efficiency improvement can be obtained for chroma that, in general, results from the separation of the Luma and Chroma coding trees in Intra slices.

However, this separation of the Luma and Chroma coding tree on the CTU level can produce some issues in terms of hardware implementation such as for a large CTU, e.g., a CTU of size 128×128 or 256×256. Moreover, fully separating the coding trees of the Luma and Chroma components implies that these Luma and Chroma are also fully separated in the compressed domain, hence also appear in a separated way in the coded bit-stream. As will be explained in more detail below, this can cause an issue for decoder implementations, where it can be desirable to ensure that a decoding pipeline can be achieved on a maximum decoding unit size which may be smaller than the CTU size. Typically, a 64×64 based decoder pipeline is desired for some decoder implementation. To do so, a maximum transform block size equal to 64×64 has been chosen for a codec approach such as that of the Versatile Video Coding (VVC) Test Model.

A feature such as luma-dependent chroma residual scaling can be used in an advanced approach to video coding/decoding such as VVC. An approach to luma-dependent chroma residual scaling can involve using a scaling or inverse scaling table. The table is explicitly signaled in the stream or deduced from a table coded in the stream. In more detail, at the encoder side, an embodiment of luma-dependent chroma residual scaling can proceed as follows. When encoding a chroma block, a luma value, representative of the collocated luma block, is computed. This is typically the average of the luma samples in the luma prediction (or reconstructed) block collocated with the considered chroma block. From the computed luma value, a scaling value is picked up from the scaling table. The scaling value is applied as a multiplicative factor to the residual of the chroma prediction, before applying the transform then quantization to the chroma residual signal.

At the decoder side, when decoding a chroma block, a luma value, representative of the collocated luma block, is computed. This is typically the average of the luma samples in the luma prediction (or reconstructed) block collocated with the considered chroma block. From the computed luma value, an inverse scaling value is picked up from the inverse scaling table signalled in the stream or deduced from signalled data in the stream. The inverse scaling value is applied to the residual of the chroma prediction, after having applied the inverse quantization then inverse transform.

As used herein, a luma block or blocks being "collocated" with a chroma block may be defined as:
- the luma block contains a pixel collocated with a given position in the chroma block, such as
  - the center of the chroma block, e.g. defined as relative position ((x0+Wc)/2,(y0+Hc)/2) in the chroma block, where (x0,y0) corresponds to the relative position in the chroma picture of the top-left sample of the chroma block, and (Wc,Hc) are the horizontal/vertical dimensions of the chroma block;
  - the top left position in the chroma block, defined as relative position (x0,y0) in the chroma picture;
  - the bottom right position in the chroma block, defined as relative position (x0+Wc−1,y0+Hc−1) in the chroma picture;
  - the top right position in the chroma block, defined as relative position (x0+Wc−1,y0) in the chroma picture;
  - the bottom left location in the chroma block, defined as relative position (x0,y0+Hc−1) in the chroma picture;
- the luma blocks collocated with several given positions in the chroma block, such as the ones mentioned above; for instance, the luma blocks collocated with the four chroma block positions top left, top right, bottom left, bottom right are considered (see FIG. 10); or
- the luma blocks collocated with all the chroma samples positions of the considered chroma block.

Combining the usage of separate luma/chroma coding tree with the luma-dependent chroma residual scaling can be problematic. Indeed, in order to process a chroma block, its corresponding luma samples from the collocated luma block need to have been processed. If the luma block is of large size, this may generate a high structural pipeline delay before being able to process the chroma block. More generally, the problem can arise when combining the usage of separate luma/chroma coding tree with coding tools involving an inter-dependency between the chroma and their collocated luma samples.

In general, at least one embodiment can involve addressing the luma-to-chroma dependency required in the decoder for the derivation of the chroma residual scaling factor of a chroma block. For example, at least one embodiment can involve reducing or removing the dependency in the decoder and thereby reduce or remove the latency for scaling the chroma residual of a block to luma samples.

An approach such as that of HEVC when using 4:4:4 chroma format can involve coding a delta QP (dQpChr) for a chroma block, or a set of chroma blocks, in the bitstream. dQpChr is derived at the encoder side based on the value of luma samples close to the chroma block and the value of the derived dQpChr is coded in the bitstream. Based on the decoded value of dQpChr, the chroma QP for the considered chroma block is adjusted. An intermediate QP value, named qPi, is derived, based on the value of the luma QP (note QpY), and on QP offsets coded at the PPS level (pps_cb_qp_offset) and at the slice (or tiles group) level (slice_cb_qp_offset). qPi is typically derived as follows.

$$qPi = Qp_Y + pps\_cb\_qp\_\text{offset} + slice\_cb\_qp\_\text{offset} + dQpChr$$

Note that in current VVC specification, no chroma delta QP is coded (no dQpChr). In VVC qPi is just derived as follows:

$$qPi = Qp_Y + pps\_cb\_qp\_\text{offset} + slice\_cb\_qp\_\text{offset}$$

Then qPi is clipped between a pre-defined minimum and maximum values.

A mapping is then performed to obtain the chroma QP noted QPc:

$$QPc = \text{map}(qPi)$$

The mapping can be done based on a table such as the following used for approaches such as HEVC and the current VVC specification:

TABLE 1

Mapping between qPi and QPc

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| $Qp_c$ | =qPi | 29 | 30 | 31 | 32 | 33 | 33 | 34 | 34 | 35 | 35 | 36 | 36 | 37 | 37 | =qPi − 6 |

Figure 9:
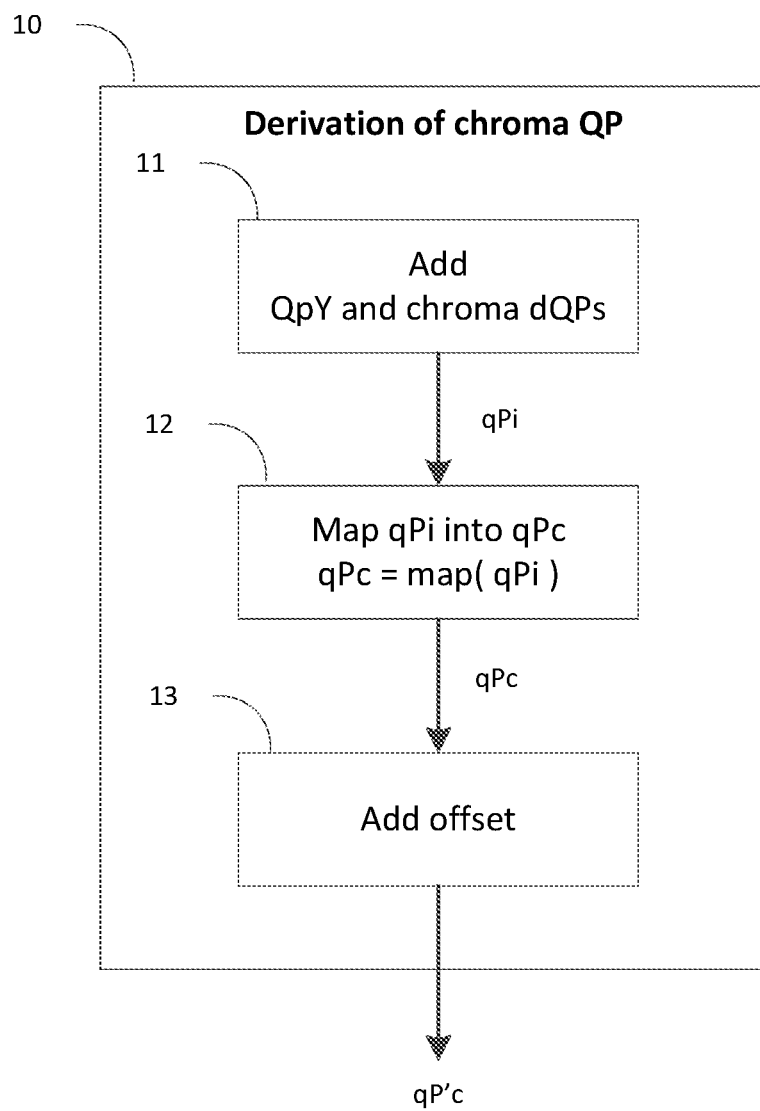
FIG. 9 illustrates an example of an embodiment of a chroma quantization parameter (QP) derivation process.

An example of the chroma QP derivation process is illustrated in FIG. 9. In FIG. 9, a process 10 begins at 11 where the luma QP and the chroma QP offsets are added. The result is an intermediate qp, noted qPi. At 12, qPi is mapped to the chroma QP value, qPc. An offset can be added to qPc at 13. However, addition of an offset at 13 is optional. Finally, the transform coefficients of the chroma block are dequantized using a quantization step (QS) derived from the value of QPc. In codecs such as AVC, HEVC and VVC, QS is determined as:

$$QS = K \cdot 2^{(QPc/6)}$$

K being a known constant value.

An issue with the described approach can be that the granularity of delta QP is 1, which means that QS can only vary by a minimum range of $2^{(1/6)}$ (approximatively equal to 1.12 which means an increase—or decrease—by 12% for an increase—or decrease—of 1 of the dQpChr value). This value can be too high for performing a chroma residual scaling with the required granularity. For example, the scaling factors used in chroma residual scaling have relative variations that can be smaller than this value as illustrated in Table 2 below. Table 2 provides an example of a scaling factor table illustrating that the scaling factors variations compared to a neutral value (scaling=1), take values from 0% to 11%, with the smallest granularity equal to 3.1%.

TABLE 2

Example of chroma residual scaling table

| index | Scaling (integer 11 bits) | Scaling (float) | relative variation to 1 |
|---|---|---|---|
| [0] | 2048 | 1.000 | 0.0% |
| [1] | 1899 | 0.927 | 7.3% |
| [2] | 1985 | 0.969 | 3.1% |
| [3] | 1985 | 0.969 | 3.1% |
| [4] | 1985 | 0.969 | 3.1% |
| [5] | 1985 | 0.969 | 3.1% |
| [6] | 1820 | 0.889 | 11.1% |
| [7] | 1820 | 0.889 | 11.1% |
| [8] | 1820 | 0.889 | 11.1% |
| [9] | 1820 | 0.889 | 11.1% |
| [10] | 1985 | 0.969 | 3.1% |

TABLE 2-continued

Example of chroma residual scaling table

| index | Scaling (integer 11 bits) | Scaling (float) | relative variation to 1 |
|---|---|---|---|
| [11] | 1985 | 0.969 | 3.1% |
| [12] | 1985 | 0.969 | 3.1% |
| [13] | 1985 | 0.969 | 3.1% |
| [14] | 1985 | 0.969 | 3.1% |
| [15] | 2048 | 1.000 | 0.0% |

At least one embodiment involves deriving at the encoder the index of the scaling factor from luma samples close to the chroma block, and signaling in the bitstream the chroma scaling factor index for the chroma block, or a set of chroma blocks. In at least one variant, a delta QP can be coded instead of a chroma scaling factor index, but using a finer granularity than, e.g., that used by HEVC or VVC QP (the quantization step doubles for each increase of the QP by a value of 6). In this variant, one or more processes can be adapted such as, e.g., the QPc derivation or the inverse quantization process.

In general, at least one embodiment involves chroma residual scaling of a chroma block. A syntax element can be added in the bitstream, e.g., named in the current document chroma_residual_scaling_idx, for each given structural entity. For ease of understanding, the following description relates to the structural entity being a CTU. However, as will be apparent to one skilled in the art, the described embodiments, features, aspects and variants can apply to any other structural entity, such as the slice, tile, brick, VDPU, CU, TU, or Quantization Group (QG).

The inserted syntax element chroma_residual_scaling_idx for a given CTU corresponds to the index in the chroma scaling factor table of the scaling factor to be applied to the chroma residual of the chroma blocks belonging to the considered CTU.

Figure 10:
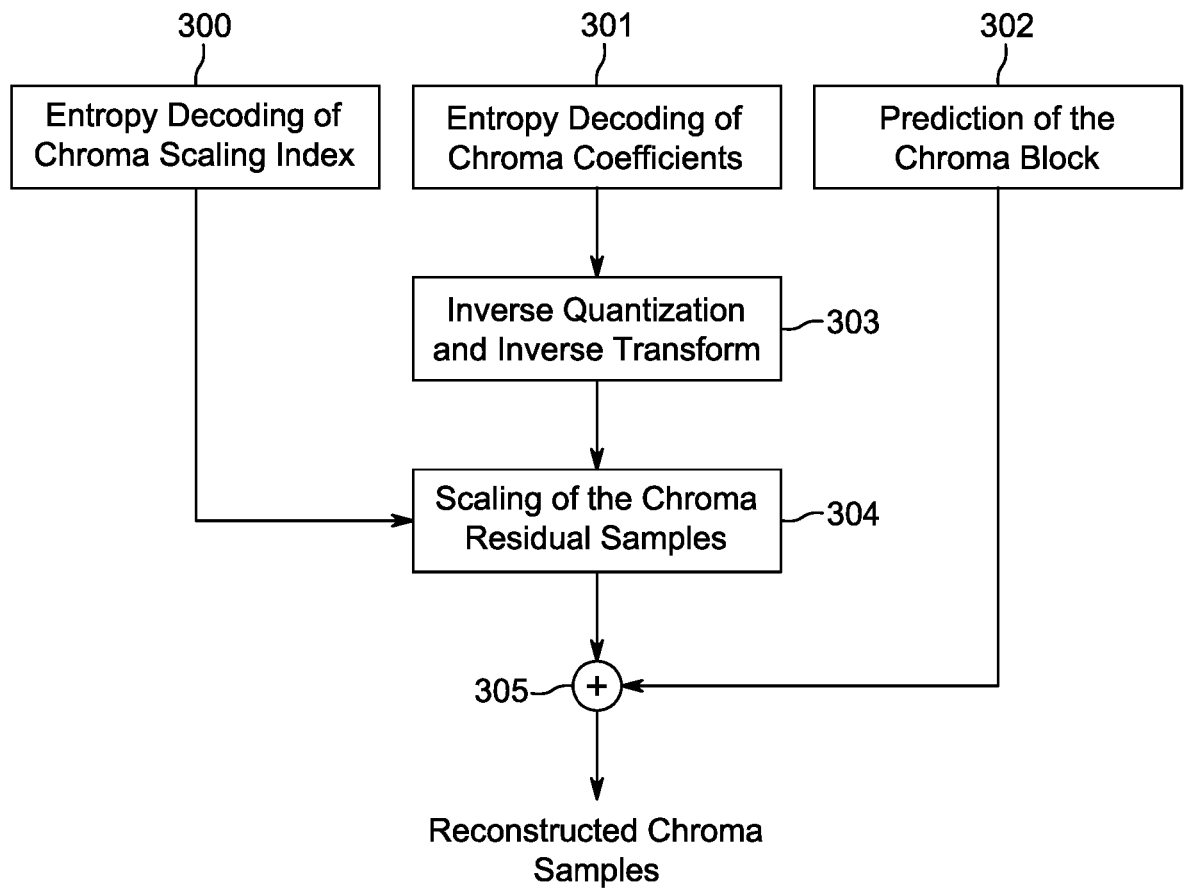
FIG. 10 illustrates an example of an embodiment of a chroma decoding process using a scaling factor index signaling.

A block diagram of an example of a decoding process for a CTU according to at least one embodiment is depicted in FIG. 10. In FIG. 10, at 300, the chroma scaling factor index is decoded. At 301, the chroma residual transform coefficients are decoded. At 302, the prediction chroma samples are derived. At 303, which follows 301, the inverse quantization and inverse transform of the chroma residual transform coefficients occurs. This results in the chroma residual samples. At 304, the chroma residual samples are scaled based on the scaling factor derived from the chroma scaling factor index. At 305, the residual is added to the prediction signal. This results in the reconstructed chroma samples before the potential application of loop filtering.

In general, at least one embodiment involves spatial granularity for coding the chroma residual scaling index. For example, in an embodiment, the syntax element chroma_residual_scaling_idx is coded for each CTU. In another example of an embodiment, the syntax element chroma_residual_scaling_idx is coded for each VDPU. In another example of an embodiment, the syntax element chroma_residual_scaling_idx is coded for non-overlapping areas of size Wc*Hc, where Wc and Hc are either pre-defined values indicated in the decoder specification, or values signaled at a higher level in the bitstream (e.g. tile, tiles group, slice, PPS, SPS, APS).

In HEVC, delta QP can be specified for each quantization group (QG), that includes groups of Coding blocks, defined by a given maximum split depth (diff_cu_qp_delta_depth syntax element found in Picture Parameter Set). All blocks resulting from further splits belong to the same quantization group and share the same QP (more precisely, they share the same QP prediction and specify at most one delta QP). Quantization Groups (QG) are defined differently in VVC, based on coding blocks area rather than partitioning depth.

In at least one embodiment, the syntax element chroma_residual_scaling_idx is coded at the same level as the delta QP values, that is, at Quantization Group (QG) level. This advantageously provides a unified design for the signaling of the dQP and of the chroma_residual_scaling_idx syntax elements.

In at least one embodiment, the syntax element chroma_residual_scaling_idx is coded at CTU split depth 0 or 1, that is, considering the current VVC specification (JVET document JVET-N1001, "Versatile Video Coding (Draft 5)"), for CU size 128×128 (depth 0) or 64×64 (depth 1).

In general, at least one embodiment involves predictive coding of the chroma residual scaling index. For example, in an embodiment, the syntax element chroma_residual_scaling_idx is added to a prediction value of the scaling factor index, noted idxPred. In another example of an embodiment, idxPred is derived from the scaling factor indexes applied to areas (e.g. CTUs or QGs) neighboring the area (e.g. CTUs or QGs) comprising the current chroma block. For example, idxPred for the current CTU is equal to the scaling factor index used for the latest processed CTU. In a variant, idxPred for the current QG is equal to the scaling factor index used for the latest processed QG. In another example of an embodiment, idxPred for the current chroma block is equal to the average of the scaling factor indexes, or scaling factors derived from those indexes, used for the top/left chroma blocks neighboring the current chroma block.

In an embodiment, if the top and left chroma blocks neighboring the current chroma block are available, idxPred is computed as the average of the chroma_residual_scaling_idx value from the top and left chroma blocks. If only the top chroma block neighboring the current chroma block is available, idxPred is computed as the average of the chroma_residual_scaling_idx value from the top chroma block. If only the left chroma block neighboring the current chroma block is available, idxPred is computed as the average of the chroma_residual_scaling_idx value from the left chroma block. If none of the top and left chroma blocks neighboring the current chroma block is available, idxPred is set to pre-defined value (e.g. 0).

In another example of an embodiment, idxPred is derived from the luma values of the area neighboring the area for which the current value of chroma_residual_scaling_idx applies.

As illustrated in table 2, it may happen that the chroma residual scaling table comprises redundant scaling factors for different index values. This may lead to loss of coding efficiency, as this may lead to encoding different index values even if the resulting scaling factors are the same or are close. In an embodiment, in order to improve the coding efficiency, a step of removing the index redundancies is applied prior to encoding (and possibly decoding) the index table, or prior to encoding (and possibly decoding) the indexes. For instance, referring to FIG. 13, a step 607a can be inserted prior to step 601, or a step 607b can be inserted prior to step 606, as illustrated in FIG. 13A. In an embodiment, step 607a/607b is based on a clustering of the chroma scale values. An example of an embodiment is illustrated by the pseudo-code below. It is considered that there is initially a maximum of N possible index values (typically N=16). A distance between chroma scaling values is defined as dist (a,b). For instance, dist(a,b) is the absolute value of (a-b). An equivalence table, named realIdx, is defined and computed as described in the pseudo-code below.

```
For idx=1 to N-1
    For idx1=0 to idx-1
        If ( dist( chromaScal[idx], chromaScal[idx1] ) < Thresh )
            realIdx[ idx ] = idx1
            stop the loop
        else go to next idx1 value until end of loop
    Go to next idx value until end of loop
```

Where Thresh is a pre-defined threshold.
The real scaling table can then be reduced to the reduced table, compared to the initial scaling table, where only non-redundant scale values are left. For instance, the 16 elements of Table 2 can be reduced to 4 elements below by removing all elements having the same scaling value (corresponding to Thresh=0). With Thresh set to 30, only 3 elements are required.

Initial Table

| index | Scaling (integer 11 bits) | Scaling (float) |
|---|---|---|
| [0] | 2048 | 1.000 |
| [1] | 1899 | 0.927 |
| [2] | 1985 | 0.969 |
| [3] | 1985 | 0.969 |
| [4] | 1985 | 0.969 |
| [5] | 1985 | 0.969 |
| [6] | 1820 | 0.889 |
| [7] | 1820 | 0.889 |
| [8] | 1820 | 0.889 |
| [9] | 1820 | 0.889 |
| [10] | 1985 | 0.969 |
| [11] | 1985 | 0.969 |
| [12] | 1985 | 0.969 |
| [13] | 1985 | 0.969 |
| [14] | 1985 | 0.969 |
| [15] | 2048 | 1.000 |

Non-redundant table (Thresh=0)

| index | Scaling (integer 11 bits) | Scaling (float) |
|---|---|---|
| [0] | 2048 | 1.000 |
| [1] | 1899 | 0.927 |
| [2] | 1985 | 0.969 |
| [3] | 1820 | 0.889 |

Non-redundant table (Thresh=30)

| index | Scaling (integer 11 bits) | Scaling (float) |
|---|---|---|
| [0] | 2048 | 1.000 |
| [1] | 1899 | 0.927 |
| [2] | 1820 | 0.889 |

Hence, instead of coding up to N different values, a reduced number of possible values are coded, which saves coding bits.

The index redundancies removal can be encoder-only, or it can be normatively applied at the decoder prior to the decoding of the indexes, in order to reduce the size of the scale factors.

Figure 16:
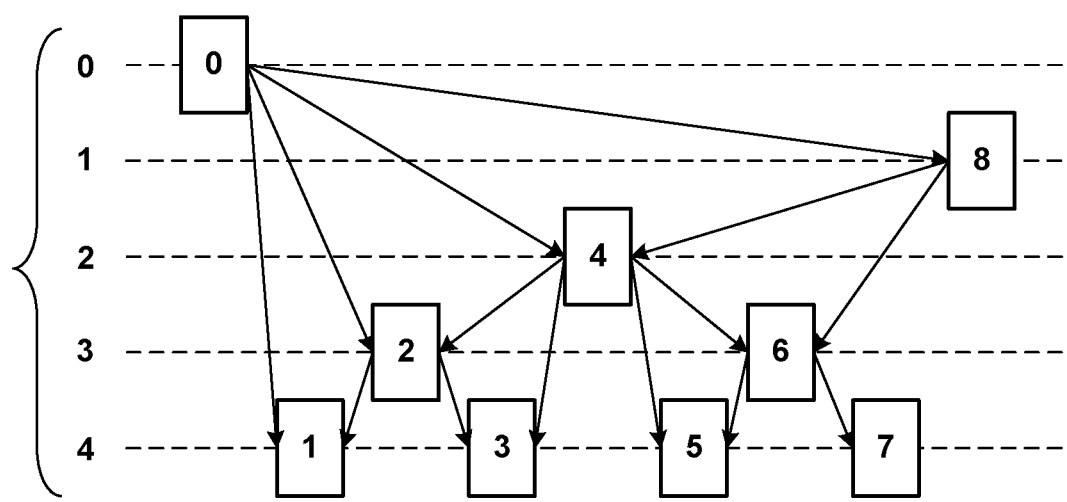
FIG. 16 illustrates an example of temporal layers in accordance with at least one embodiment described herein.

When applying the coding of the chroma residual scaling index for all pictures of a sequences, the coding cost overhead can become substantial and generate high coding loss. In order to avoid this problem, in another embodiment, the chroma residual scaling is only enabled for specific temporal layers. An example of temporal layers is illustrated in FIG. 16. FIG. 16 shows a succession of 9 pictures, numbered from 0 to 8. The horizontal lines depict the temporal layers. The first picture 0 is at temporal layer 0. The $8^{th}$ picture is coded depending on picture 0 and is at temporal layer 1. Other pictures are coded depending on two surrounding pictures, of temporal layer lower than or equal to the considered picture. In one embodiment, chroma residual scaling is only enabled for pictures having a temporal layer equal to 0 or 1. For pictures having a temporal layer above these values, chroma residual scaling is disabled. In the example of FIG. 16, pictures 0 and 8 can use chroma residual scaling, but not the other pictures.

At least one embodiment in accordance with the present disclosure can involve syntax, e.g., a method or apparatus for producing syntax or a signal or bitstream including syntax. An example of an embodiment involving syntax as illustrated and described in the APPENDIX to this document. In the APPENDIX, text in a reduced-size font corresponds to an example of syntax in accordance with at least one of the embodiments described above and in the context of an outline of syntax such as that provided in VTM5.0 syntax (described in the document JVET-N1001 version 9). The section numbering included in the APPENDIX corresponds to the numbering used in JVET-N1001 version 9.

In at least one example of an embodiment, there is no more any reference to a scaling factor table, but the scaling factor value itself is signaled in the bitstream as a signed integer value, relative to a neutral value. For example, the scaling factor value can be coded with a 11-bit precision, relative to a neutral value of 2^11 (corresponding to an actual scaling factor of 1). As another example, Table 1 lists examples of different scaling factors able 1 and the scaling factor values that would be coded in the stream. The precision may be too high, and preferably the bit-depth for coding the scaling factor values could be reduced from 11 to 6, 5 or 4 bits (leading to $1/64^{th}$, $1/32$th or $1/16^{th}$ accuracy, instead of the 0.12 accuracy enabled by using a dQP value).

TABLE 3

Example of scaling factors and corresponding coded value

| scaling factor | Scaling (float) | coded value |
|---|---|---|
| 2048 | 1.000 | 0 |
| 1985 | 0.969 | 63 |
| 1899 | 0.927 | 149 |
| 1820 | 0.889 | 228 |

At least one example of an embodiment can include coding of a delta QP with increased granularity of the delta QP (i.e., finer granularity). For example, in an embodiment, the usage of a scaling factor is replaced by the usage of a chroma delta QP (dQPchResScal), that can be different or modified in comparison to the conventional chroma delta QP (dQpChr), e.g., with a finer granularity than the conventional QP dQpChr, defined by the parameter F. As a specific and non-limiting example, the dQP granularity can be doubled compared to HEVC. That is, the quantization step is increased each F=12 dQP values, instead of 6 as in HEVC. In other words, increasing QP by 1 corresponds to multiplying the quantization step by $2^{(1/F)}=2^{(1/12)}$. In a variant, the QP granularity can be increased only for the chroma components.

Figure 11:
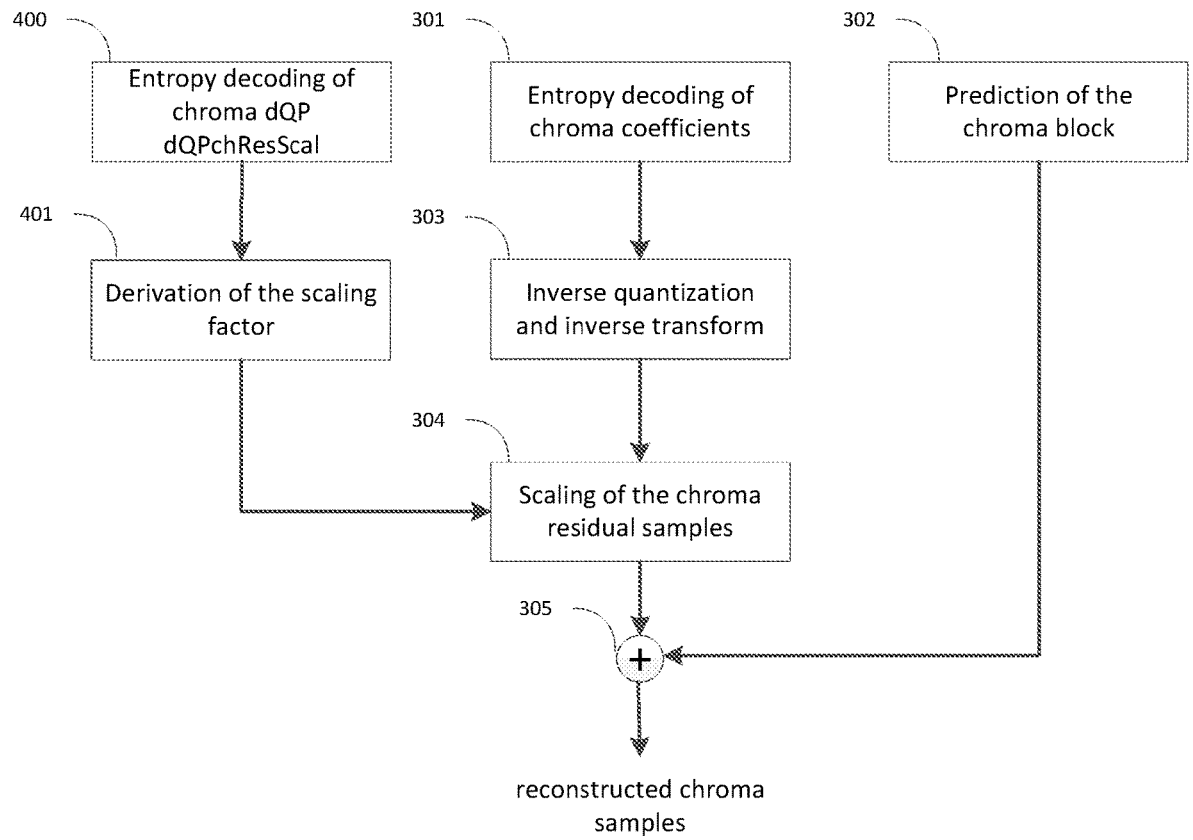
FIG. 11 illustrates an example of an embodiment of a chroma decoding process using a scaling factor derived from a fine-grain signaled delta QP (dQP)

In at least one embodiment, the modified chroma delta QP can be used to derive the scaling factor applied to the chroma residual samples. For example, FIG. 11 shows a block diagram of an embodiment wherein the modified dQP, i.e., dQPchResScal, can be used to derive a scaling factor applied to the chroma residual values. In FIG. 11, at 400, the dQP value dQPchResScal for the Quantization group that contains the chroma block is decoded. At 401, a chroma scaling factor value is derived from the decoded dQP value dQPchResScal. The other blocks provide operations or processing similar to the block diagram of FIG. 10. At 301, the chroma residual transform coefficients are decoded. At 302, the prediction chroma samples are derived and 303 follows 301 to perform the inverse quantization and inverse transform of the chroma residual transform coefficients. This results in the chroma residual samples. At 304, the chroma residual samples are scaled based on the scaling factor derived from the chroma dQP value dQPchResScal. At 305, the residual is added to the prediction signal. This results in the reconstructed chroma samples before the potential application of loop filtering.

Table 4 below shows examples of scaling factor values linked to dQP values when the dQP granularity is such that the quantization step doubles each F=12 increments. The values in the $3^{rd}$ column are computed as $2^{(dQPchResScal/F)}$. The values in the $2^{nd}$ columns are computed as INT $(2048*2^{(dQPchResScal/F)}+0.5)$, where INT(x) corresponds to the integer (floor) value of x. Table 5 shows examples of scaling factor values linked to dQP values when the dQP granularity is such that the quantization step doubles each F=24 increments.

TABLE 4

Example of scaling factor values linked to dQP values (F = 12)

| dQPchResScal | Scaling (integer 11 bits) | Scaling (float) | relative variation to 1 |
| --- | --- | --- | --- |
| 0 | 2048 | 1.000 | 0.00% |
| 1 | 2170 | 1.059 | 5.95% |
| 2 | 2299 | 1.122 | 12.25% |
| 3 | 2435 | 1.189 | 18.92% |
| 4 | 2580 | 1.260 | 25.99% |
| 5 | 2734 | 1.335 | 33.48% |
| 6 | 2896 | 1.414 | 41.42% |
| 7 | 3069 | 1.498 | 49.83% |
| 8 | 3251 | 1.587 | 58.74% |
| 9 | 3444 | 1.682 | 68.18% |
| 10 | 3649 | 1.782 | 78.18% |
| 11 | 3866 | 1.888 | 88.77% |
| 12 | 4096 | 2.000 | 100.00% |

TABLE 5

Example of scaling factor values linked to dQP values (F=24)

| dQPchResScal | Scaling (integer 11 bits) | Scaling (float) | relative variation to 1 |
| --- | --- | --- | --- |
| 0 | 2048 | 1.000 | 0.00% |
| 1 | 2108 | 1.029 | 2.93% |
| 2 | 2170 | 1.059 | 5.95% |
| 3 | 2233 | 1.091 | 9.05% |
| 4 | 2299 | 1.122 | 12.25% |
| 5 | 2366 | 1.155 | 15.54% |
| 6 | 2435 | 1.189 | 18.92% |
| 7 | 2507 | 1.224 | 22.41% |
| 8 | 2580 | 1.260 | 25.99% |
| 9 | 2656 | 1.297 | 29.68% |
| 10 | 2734 | 1.335 | 33.48% |
| 11 | 2814 | 1.374 | 37.40% |
| 12 | 2896 | 1.414 | 41.42% |
| 13 | 2981 | 1.456 | 45.57% |
| 14 | 3069 | 1.498 | 49.83% |
| 15 | 3158 | 1.542 | 54.22% |
| 16 | 3251 | 1.587 | 58.74% |
| 17 | 3346 | 1.634 | 63.39% |
| 18 | 3444 | 1.682 | 68.18% |
| 19 | 3545 | 1.731 | 73.11% |
| 20 | 3649 | 1.782 | 78.18% |
| 21 | 3756 | 1.834 | 83.40% |
| 22 | 3866 | 1.888 | 88.77% |
| 23 | 3979 | 1.943 | 94.31% |
| 24 | 4096 | 2.000 | 100.00% |

Figure 12:
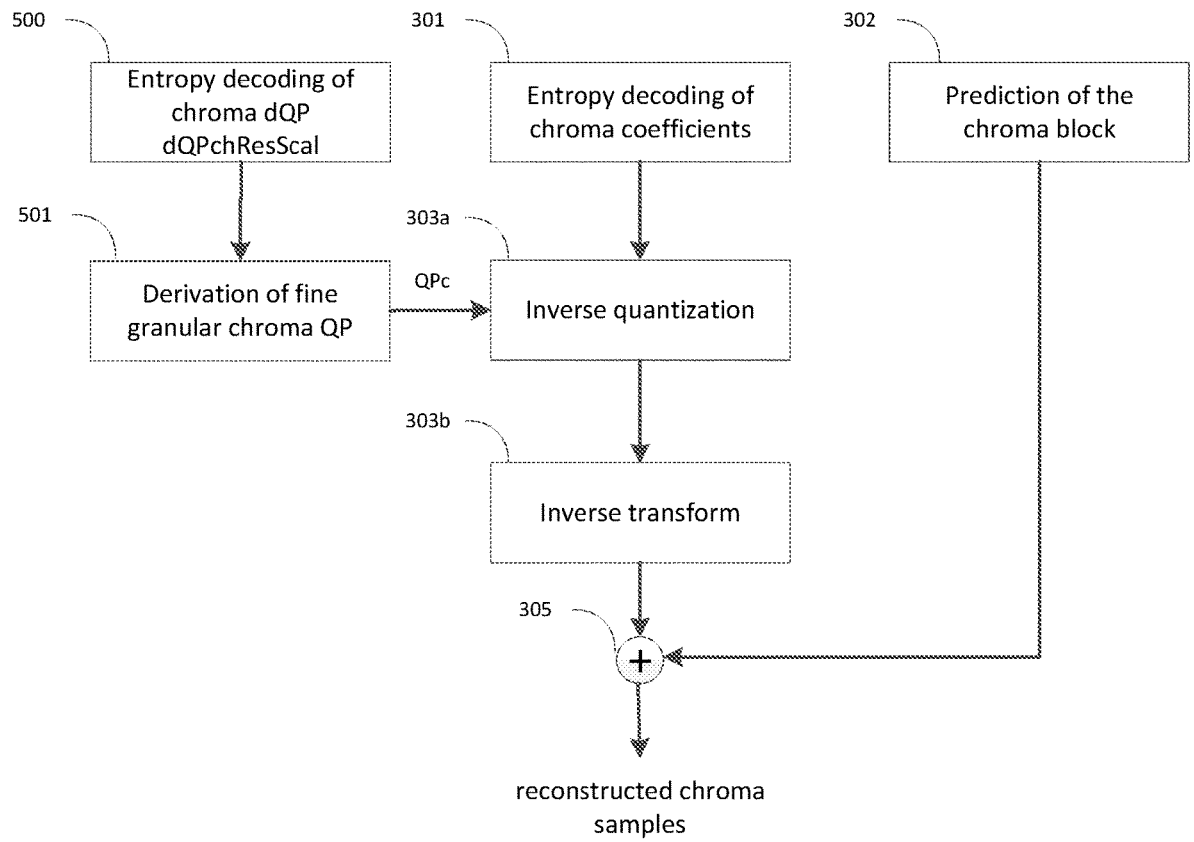
FIG. 12 illustrates an example of another embodiment of a chroma decoding process using a scaling factor derived from a fine-grain signaled dQP.

FIG. 12 provides a simplified block diagram of another example of an embodiment, where the modified dQP, i.e., dQPchResScal, can be used for performing the inverse quantization of the chroma transform coefficients. dQPchResScal can be used in addition to the conventional dQPch. At 500, the dQP value for the Quantization group that contains the chroma block is decoded. At 501, a chroma QP, QPc, is derived, using at least dQPchResScal, and if applicable, dQPch as input, resulting in a QPc with fine granularity. At 301, the chroma residual transform coefficients are decoded followed by 303a, where the inverse quantization of the decoded transform coefficients occurs using a fine granular QPc, and 303b where the inverse transform of the inverse quantized chroma residual transform coefficients occurs. This produces the chroma residual samples. At 302, the prediction chroma samples are derived. Then, at 305, the residuals from 303b are added to the prediction signal from 302 to produce the reconstructed chroma samples before the potential application of loop filtering.

At least one example of an embodiment of derivation of QPc with higher (finer) granularity at 501 in FIG. 12 can be based on a fine granularity dQPchResScal and proceed as follows. First qPi is derived.

$$qPi = Qp_Y + pps\_cb\_qp\_\text{offset} + slice\_cb\_\_\text{offset} + dQPchResScal/SC$$

where SC=(G/6). For example, SC=2 for G=12, SC=4 for G=24. Then qPi is clipped between a pre-defined minimum and maximum values. The mapping is then performed to obtain the chroma QP noted QPc:

$$QPc = \text{map}(qPi)$$

In HEVC and in the current VVC specification, the mapping is done based on Table 6.

TABLE 6

Mapping between qPi and QPc

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| $Qp_c$ | =qPi | 29 | 30 | 31 | 32 | 33 | 33 | 34 | 34 | 35 | 35 | 36 | 36 | 37 | 37 | =qPi − 6 |

Finally, QPc is derived as $$QPc = SC*QPc + (dQPchResScal \% SC)$$

The granularity of QPc is increased by the factor SC, compared to the conventional QPc granularity.

In the current VVC specification (as well as in HEVC), the QP granularity (noted G) is 6 (the quantization step doubles for each increase of 6) and inverse quantization such as at 303a in FIG. 12 is performed as follows. Once the QPc parameter has been derived (by step 501), the transform coefficients TC[x][y] are inverse quantized into the values TCiQ[x][y] as follows.

The list levelScale[ ] is specified as levelScale[k]={40, 45, 51, 57, 64, 72} with k=0 . . . 5.

The intermediate scaling factor m[x][y] is set equal to 16.

The scaling factor ls[x][y] is derived as follows:

If dep_quant_enabled_flag is equal to 1, the following applies:

$$ls[x][y](m[x][y]*levelScale[(QPc+1)\% \quad 6]) < ((QPc+1)/6)$$

Otherwise (dep_quant_enabled_flag is equal to 0), the following applies:

$$ls[x][y](m[x][y]*levelScale[QPc \% 6]) < (QPc/6)$$

The value dnc[x][y] is derived as follows:

$$dnc[x][y](TC[x][y]*ls[x][y]*rectNorm+bdOffset) >> bdShift$$

The scaled transform coefficient TCiQ[x][y] is derived as follows:

$$TCiQ[x][y]=Clip3(CoefMin,CoefMax,dnc[x][y])$$

Where rectNorm is a normalization factor, bdShift is a shift parameter depending on the bit-depth of the samples, bdOffset=(1<<bdShift)>>1, and CoeffMin, CoeffMax are the minimum and maximum possible values of the coefficients (set to −(1<<15) and (1<<15)−1 in the current specification). Note that levelScale[i] is derived as Int(2^((2+i)÷6)+0.5) where the operator "÷" is the floating point division and Int(x) is the integer value of x.

At least one example of an embodiment involves modifying the process at 303a described above. For doubling the granularity G (G=12 instead of 6) of the quantization (and of QPc) the process can be adapted as follows. Changes compared to the current VVC specification are highlighted in grey.

The list levelScale[ ] is specified as levelScale[k]={40, 43, 45, 48, 51, 54, 57, 60, 64, 68, 72, 76} with k=0 . . . (G−1).

The intermediate scaling factor m[x][y] is set equal to 16.

The scaling factor ls[x][y] is derived as follows:

If dep_quant_enabled_flag is equal to 1, the following applies:

$$ls[x][y](m[x][y]*levelScale[(QPc+1)\% \quad G]) < ((QPc+1)/G)$$

Otherwise (dep_quant_enabled_flag is equal to 0), the following applies:

$$ls[x][y](m[x][y]*levelScale[QPc \% G]) < (QPc/G)$$

The value dnc[x][y] is derived as follows:

$$dnc[x][y](TC[x][y]*ls[x][y]*rectNorm+bdOffset) >> bdShift$$

The scaled transform coefficient TCiQ[x][y] is derived as follows:

$$TCiQ[x][y]=Clip3(CoeffMin,CoeffMax,dnc[x][y])$$

For even finer granularity (G=24 instead of 6) the table levelScale can be modified as follows.

The list levelScale[ ] is specified as levelScale[k]={40, 41, 43, 44, 45, 47, 48, 49, 51, 52, 54, 55, 57, 59, 60, 62, 64, 66, 68, 70, 72, 74, 76, 78} with k=0 . . . (G−1).

In at least one other example of an embodiment, the granularity of the conventional chroma dQP can remain at 6, and another syntax element, dQP_refine, can be coded in addition to the chroma delta QP dQpChr, to refine the dQP value at a finer level. dQP_refine can take values from 0 to (SC−1), where SC=(G/6). For example, SC=2 for G=12, SC=4 for G=24. In this case, the QPc derivation at 501 in FIG. 12 is not modified as described above. In particular, the granularity of QPc is the conventional one.

However, operation at 303a in FIG. 12 is modified to add a table levelScaleRefine[k], for k=0 to (G−1), and to proceed as follows (changes in grey).

The scaling factor ls[x][y] is derived as follows:

If dep_quant_enabled_flag is equal to 1, the following applies:

levScale=levelScale[(QPc+1)% 6]+levelScaleRefine[SC*((QPc+1)% 6)+dQP_refine]

$$ls[x][y](m[x][y]*levScal]) < ((QPc+1)/6)$$

Otherwise (dep_quant_enabled_flag is equal to 0), the following applies:

levScale=levelScale[QPc % 6]+levelScaleRefine[SC*(QPc % 6)+dQP_refine]

$$ls[x][y](m[x][y]*levScal) < (QPc/6)$$

The value dnc[x][y] is derived as follows:

$$dnc[x][y](TC[x][y]*ls[x][y]*rectNorm+bdOffset) >> bdShift$$

The scaled transform coefficient TCiQ[x][y] is derived as follows:

$$TCiQ[x][y]=Clip3(CoeffMin,CoeffMax,dnc[x][y])$$

In at least one embodiment, for G=12, levelScaleRefine[k], for k=0 to (G−1) is defined as follows.

levelScaleRefine[k]={0,3,0,3,0,3,0,3,0,4,0,4}

In at least one other embodiment, for G=24, levelScaleRefine[k], for k=0 to (G−1) is defined as follows.

levelScaleRefine[k]={0,1,3,4,0,2,3,4,0,1,3,4,0,2,3,5,0,2,4,6,0,2,4,6}

The described approach advantageously avoids changes in all the other processes specified in the decoder, that use the chroma QP value used for dequantizing the chroma signal (such as the deblocking filter).

In general, at least one embodiment involves derivation of the scaling factor or delta QP at the encoder. The chroma residual scaling factor index or chroma dQP value is computed at the encoder side, based on luma samples collocated with the chroma block, or collocated with chroma samples located in the neighborhood of the chroma area (e.g. CTU or quantization group) for which the chroma residual scaling factor index or chroma dQP value applies. In at least one embodiment, the chroma residual scaling factor index or chroma dQP is derived from the average value of the prediction or reconstructed luma samples, collocated with the chroma area. In a variant, the chroma residual scaling factor index or chroma dQP is derived from the median value of the prediction or reconstructed luma samples, collocated with the chroma area. In a variant, the chroma residual scaling factor index or chroma dQP is derived from the x % largest values of the prediction or reconstructed luma samples, collocated with the chroma area. X is for instance to 10. In a variant, the chroma residual scaling factor index or chroma dQP is derived from the x % lowest values of the prediction or reconstructed luma samples, collocated with the chroma area. X is for instance to 10.

Figure 13:
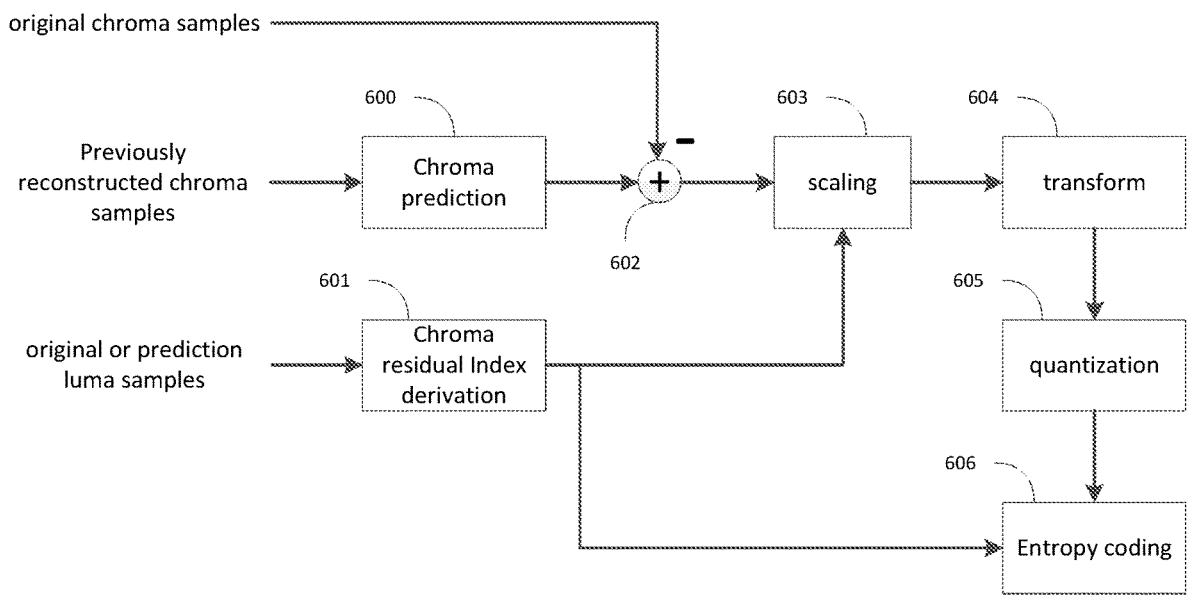
FIG. 13 illustrates an example of an embodiment of a chroma encoding process using a chroma scaling factor index.
Figure 13A:
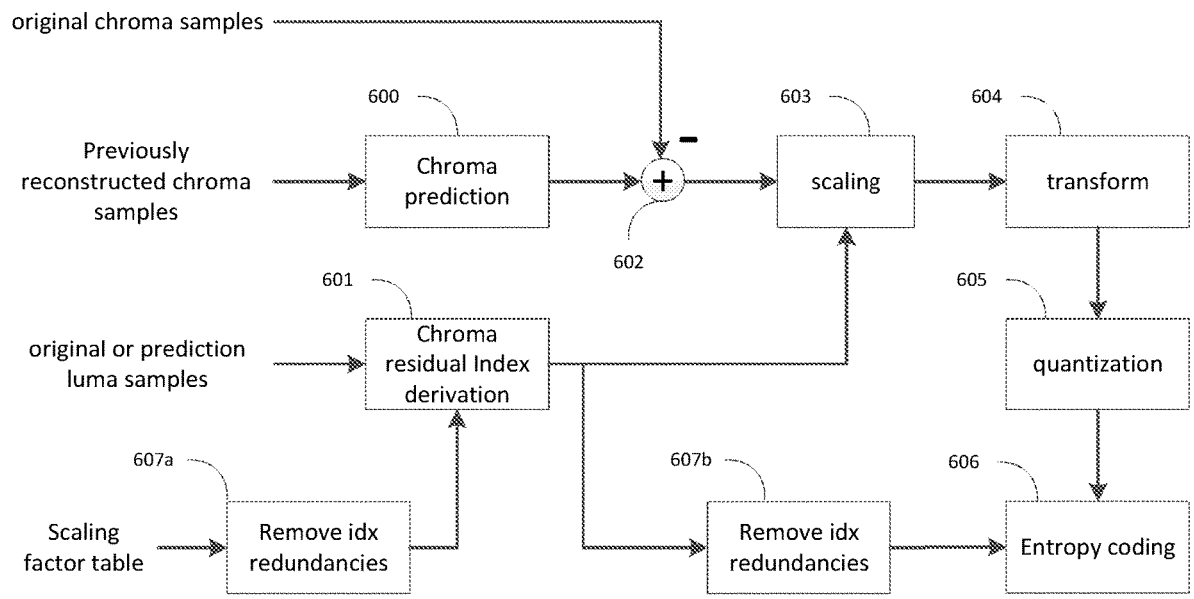
FIG. 13A illustrates an example of an embodiment of a chroma encoding process using a chroma scaling factor index, limiting index value redundancies.

An example of at least one embodiment is illustrated in FIG. 13 which shows a block diagram of an encoder or encoder process in the case where a chroma scaling index is coded. In FIG. 13, at 600 the chroma prediction samples for the considered chroma block are computed. At 602, the prediction samples are subtracted from the original chroma samples, and this generates the chroma prediction residual. At 601, an index of the chroma scaling factor is derived from the original or luma samples collocated or near the chroma samples of the chroma block. At 603, the chroma residual is scaled based on the scaling factor identified by the chroma scaling index. Then the residual is processed by the transform (604) followed by quantization (605). The quantized transform coefficients of the chroma block are then entropy coded (606). The entropy coder also encodes the chroma scaling factor index.

Figure 14:
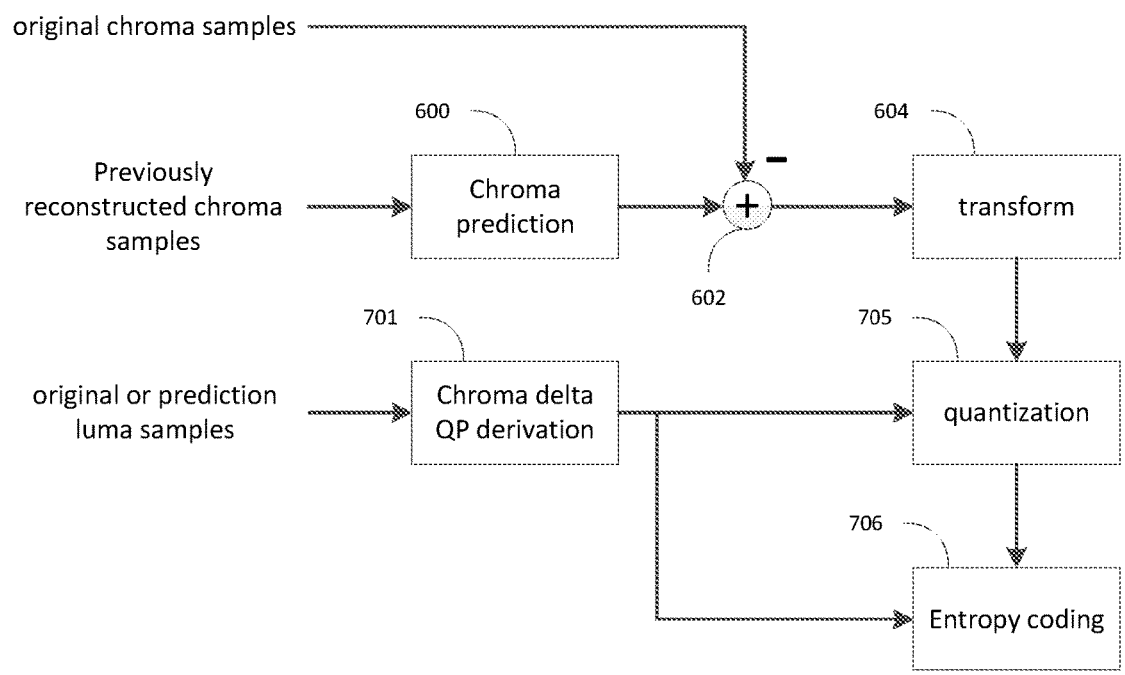
FIG. 14 illustrates an example of an embodiment of a chroma encoding process using a fine grain chroma dQP.

Another example of an embodiment is illustrated in FIG. 14 which shows a block diagram of an encoder or encoder process for the case where a chroma delta QP with fine granularity is coded and impacts the quantization process. In FIG. 14, at 600 the chroma prediction samples for the considered chroma block are computed. At 602, the prediction samples are subtracted from the original chroma samples, and this generates the chroma prediction residual. At 701, a chroma delta QP with fine granularity is derived from the original or luma samples collocated or near the chroma samples of the chroma block. Then the residual is processed by the transform (604) followed by quantization (705). The quantized transform coefficients of the chroma block are then entropy coded (706).

Figure 17:
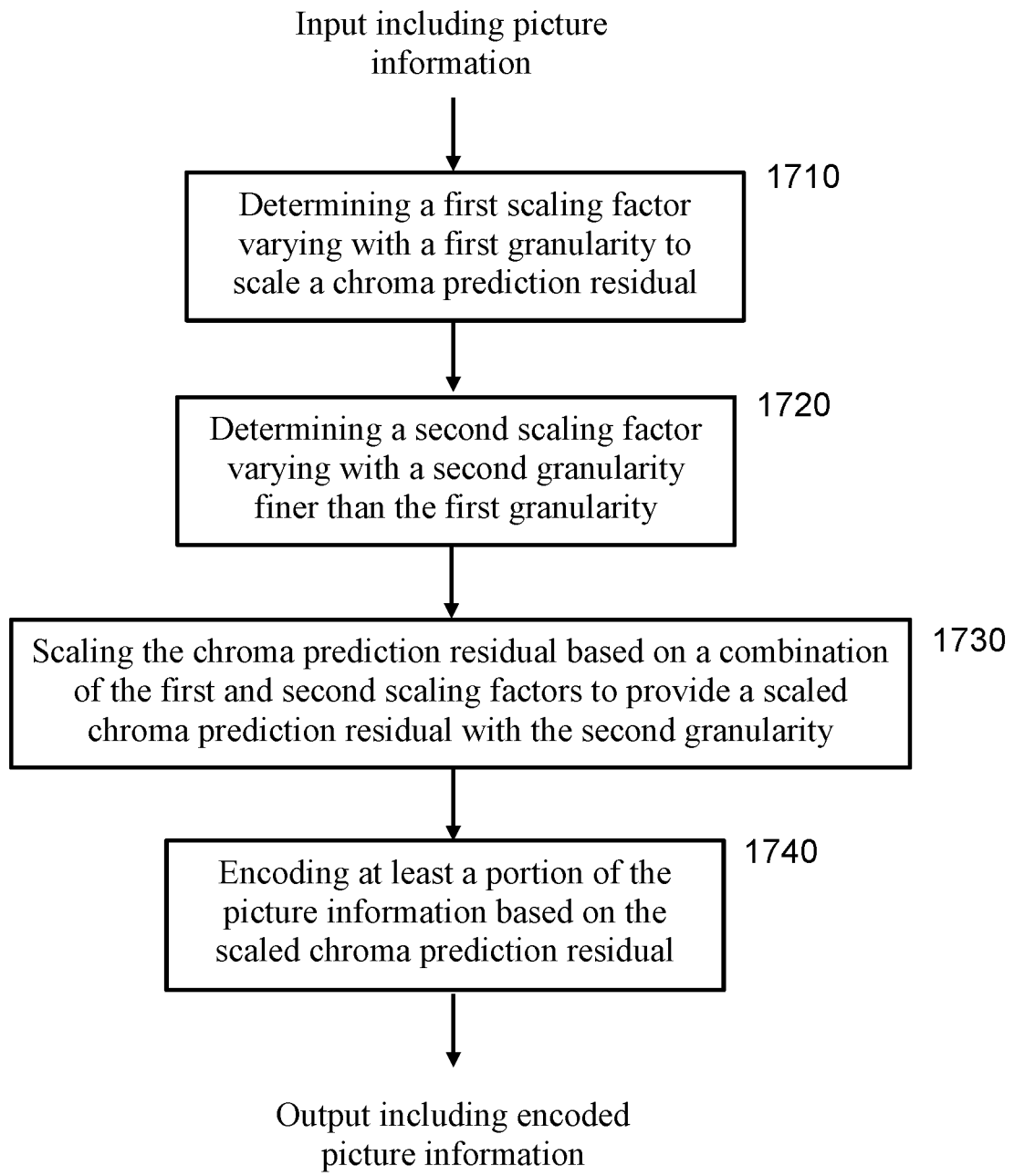
FIG. 17 illustrates an example of at least one embodiment for encoding picture information involving scaling of a chroma prediction residual as described herein.

Another example of an embodiment is illustrated in FIG. 17. In FIG. 17, an input includes picture information. At 1710, a first scaling factor is determined. The first scaling factor varies with a first granularity to scale a chroma prediction residual associated with chroma information included in the picture information. For example, the first granularity can be determined by a parameter such as G or SC as described above and can have a value such as 6. At 1720, a second scaling factor varying with a second granularity finer than the first granularity is determined. At 1730, the chroma prediction residual is scaled based on a combination of the first scaling factor and the second scaling factor to provide a scaled chroma prediction residual with the second granularity. At 1740, at least a portion of the picture information is encoded based on the scaled chroma prediction residual. An output includes the encoded picture information.

Figure 18:
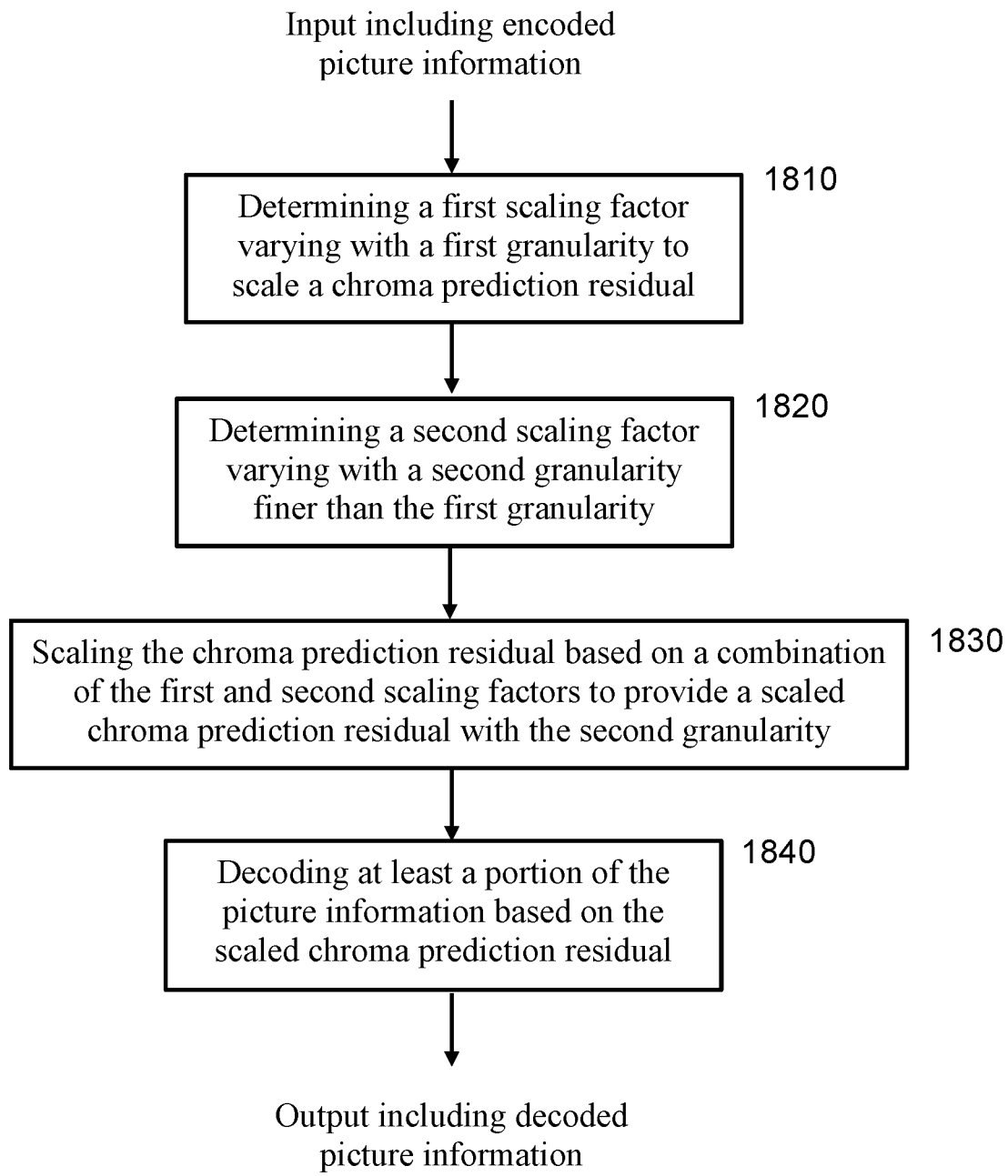
FIG. 18 illustrates an example of at least one embodiment for decoding picture information involving scaling of a chroma prediction residual as described herein.

Another example of an embodiment is illustrated in FIG. 18. In FIG. 18, an input includes encoded picture information. At 1810, a first scaling factor is determined. The first scaling factor varies with a first granularity to scale a chroma prediction residual associated with chroma information included in the picture information. For example, the first granularity can be determined by a parameter such as G or SC as described above and can have a value such as 6. At 1820, a second scaling factor varying with a second granularity finer than the first granularity is determined, e.g., the finer granularity can have a value such as 12 or 24 as described above. At 1830, the chroma prediction residual is scaled based on a combination of the first scaling factor and the second scaling factor to provide a scaled chroma prediction residual with the second granularity. At 1840, at least a portion of the picture information is decoded based on the scaled chroma prediction residual. An output includes the decoded picture information.

This document describes various examples of embodiments, features, models, approaches, etc. Many such examples are described with specificity and, at least to show the individual characteristics, are often described in a manner that may appear limiting. However, this is for purposes of clarity in description, and does not limit the application or scope. Indeed, the various examples of embodiments, features, etc., described herein can be combined and interchanged in various ways to provide further examples of embodiments.

In general, the examples of embodiments described and contemplated in this document can be implemented in many different forms. FIGS. 1 and 2 described above and FIG. 15 described below provide some embodiments, but other embodiments are contemplated and the discussion of FIGS. 1, 2 and 15 does not limit the breadth of the implementations. At least one embodiment generally provides an example related to video encoding and/or decoding, and at least one other embodiment generally relates to transmitting a bitstream or signal generated or encoded. These and other embodiments can be implemented as a method, an apparatus, a computer readable storage medium having stored thereon instructions for encoding or decoding video data according to any of the methods described, and/or a computer readable storage medium having stored thereon a bitstream or signal generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

The terms HDR (high dynamic range) and SDR (standard dynamic range) are used in this disclosure. Those terms often convey specific values of dynamic range to those of ordinary skill in the art. However, additional embodiments are also intended in which a reference to HDR is understood to mean "higher dynamic range" and a reference to SDR is understood to mean "lower dynamic range". Such additional embodiments are not constrained by any specific values of dynamic range that might often be associated with the terms "high dynamic range" and "standard dynamic range".

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules of a video encoder and/or decoder such as scaling module 151 of encoder 100 shown in FIG. 1 and inverse scaling module 251 of decoder 200 shown in FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document, for example. The specific values are for example purposes and the aspects described are not limited to these specific values.

Figure 15:
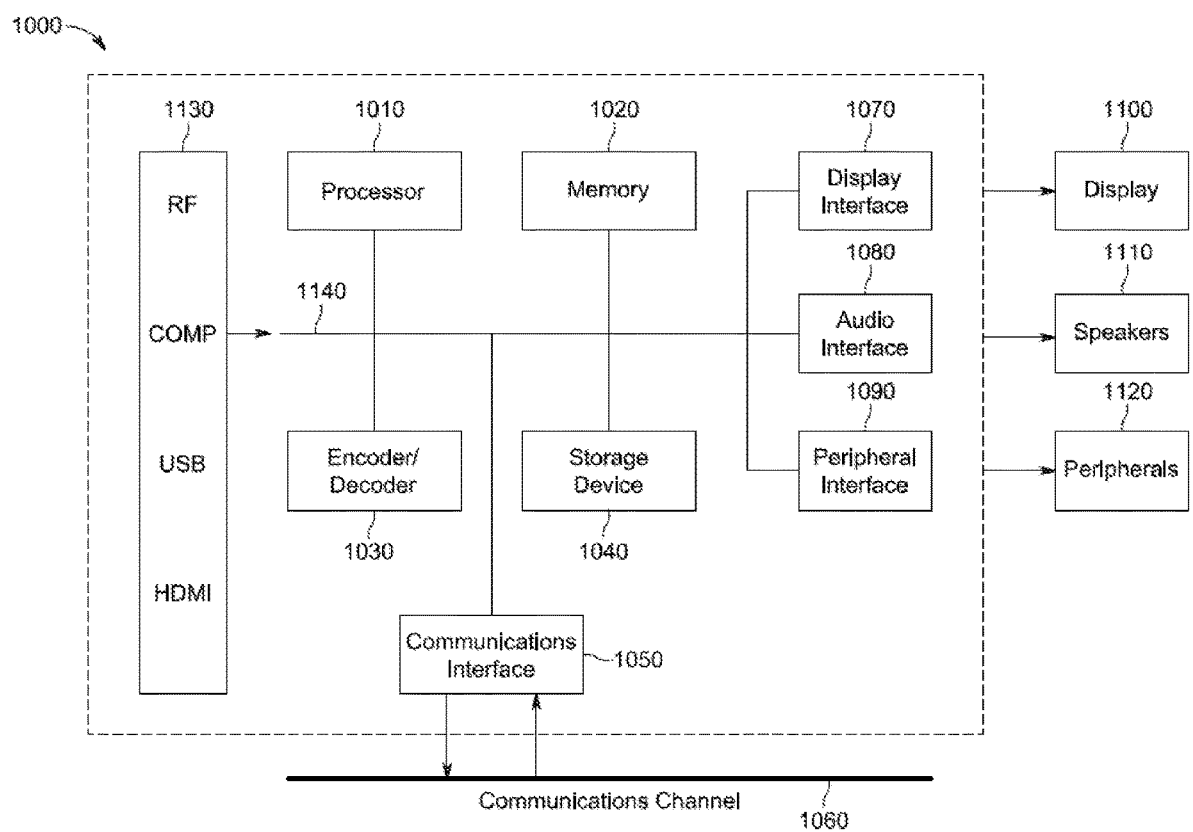
FIG. 15 provides a block diagram illustrating an example of an embodiment of apparatus in accordance with various aspects and embodiments described herein.

FIG. 15 illustrates a block diagram of an example of a system in which various aspects and embodiments can be implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or anon-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream or signal, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010. Similarly, aspects of USB or HDMI interface processing can be implemented within separate interface ICs or within processor 1010. The demodulated, error corrected, and demultiplexed stream is provided to various processing elements, including, for example, processor 1010, and encoder/decoder 1030 operating in combination with the memory and storage elements to process the datastream for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Throughout this disclosure, various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting a picture from a tiled (packed) picture, determining an upsample filter to use and then upsampling a picture, and flipping a picture back to its intended orientation.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Also, various implementations involve encoding. In an analogous way to the above discussion about "decoding", "encoding" as used in this application can encompass all or part of the processes performed, for example, on an input video sequence in order to produce an encoded bitstream or signal. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches can be based on an extensive testing of all encoding options, including all considered modes or coding parameters values, with a complete evaluation of their coding cost and related distortion of the reconstructed signal after coding and decoding. Faster approaches can also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "obtaining" various pieces of information. Obtaining the information can include one or more of, for example, determining the information, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", "one or more of", and "at least one of", for example, in the cases of "A/B", "A and/or B", "one or more of A or B" and "at least one of A and B", is intended to encompass the selection of the first listed option (A) only, or the selection of the second listed option (B) only, or the selection of both options (A and B). As a further example, in the cases of "A, B, and/or C", "one or more of A, B or C", and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for refinement. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream or signal of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Various generalized as well as particularized embodiments are also supported and contemplated throughout this disclosure. Examples of embodiments in accordance with the present disclosure include but are not limited to the following.

In general, at least one example of an embodiment can involve a method for encoding picture information wherein the method comprises: determining a first scaling factor varying with a first granularity to scale a chroma prediction residual associated with chroma information included in the picture information; determining a second scaling factor varying with a second granularity finer than the first granularity; scaling the chroma prediction residual based on a combination of the first scaling factor and the second scaling factor to provide a scaled chroma prediction residual with the second granularity; and encoding at least a portion of the picture information based on the scaled chroma prediction residual.

In general, at least one example of an embodiment can involve a method for decoding picture information, wherein the method comprises: determining a first scaling factor varying with a first granularity to scale a chroma prediction residual associated with chroma information included in the picture information; determining a second scaling factor varying with a second granularity finer than the first granularity; scaling the chroma prediction residual based on a combination of the first scaling factor and the second scaling factor to provide a scaled chroma prediction residual with the second granularity; and decoding at least a portion of the picture information based on the scaled chroma prediction residual.

In general, at least one example of an embodiment can involve apparatus for encoding picture information comprising one or more processors configured to: determine a first scaling factor varying with a first granularity to scale a chroma prediction residual associated with chroma information included in the picture information; determine a second scaling factor varying with a second granularity finer than the first granularity; scale the chroma prediction residual based on a combination of the first scaling factor and the second scaling factor to provide a scaled chroma prediction residual with the second granularity; and encode at least a portion of the picture information based on the scaled chroma prediction residual.

In general, at least one example of an embodiment can involve apparatus for decoding picture information comprising one or more processors configured to: determine a first scaling factor varying with a first granularity to scale a chroma prediction residual associated with chroma information included in the picture information; determine a second scaling factor varying with a second granularity finer than the first granularity; scale the chroma prediction residual based on a combination of the first scaling factor and the second scaling factor to provide a scaled chroma prediction residual with the second granularity; and decode at least a portion of the picture information based on the scaled chroma prediction residual.

In general, at least one example of an embodiment can involve a method for encoding picture information comprising: determining a first scaling factor varying with a first granularity to scale a chroma prediction residual associated with chroma information included in the picture information; combining the first scaling factor with a second scaling factor to provide a combined scaling factor having a second granularity finer than the first granularity; scaling the chroma prediction residual based on the combined scaling factor to provide a scaled chroma prediction residual varying with the second granularity; and encoding at least a portion of the picture information based on the scaled chroma prediction residual.

In general, at least one example of an embodiment can involve a method for decoding picture information comprising: determining a first scaling factor varying with a first granularity to scale a chroma prediction residual associated with chroma information included in the picture information; combining the first scaling factor with a second scaling factor to provide a combined scaling factor having a second granularity finer than the first granularity; scaling the chroma prediction residual based on the combined scaling factor to provide a scaled chroma prediction residual varying with the second granularity; and decoding at least a portion of the picture information based on the scaled chroma prediction residual.

In general, at least one example of an embodiment can involve apparatus for encoding picture information comprising one or more processors configured to: determine a first scaling factor varying with a first granularity to scale a chroma prediction residual associated with chroma information included in the picture information; combine the first scaling factor with a second scaling factor to provide a combined scaling factor having a second granularity finer than the first granularity; scale the chroma prediction residual based on the combined scaling factor to provide a scaled chroma prediction residual varying with the second granularity; and encode at least a portion of the picture information based on the scaled chroma prediction residual.

In general, at least one example of an embodiment can involve apparatus for decoding picture information comprising one or more processors configured to: determine a first scaling factor varying with a first granularity to scale a chroma prediction residual associated with chroma information included in the picture information; combine the first scaling factor with a second scaling factor to provide a combined scaling factor having a second granularity finer than the first granularity; scaling the chroma prediction residual based on the combined scaling factor to provide a scaled chroma prediction residual varying with the second granularity; and decoding at least a portion of the picture information based on the scaled chroma prediction residual.

In general, at least one example of an embodiment can involve a method or apparatus as described herein, wherein a second scaling factor is determined based on luma information included in the picture information and located in a vicinity of the chroma information.

In general, at least one example of an embodiment can involve a method as described herein, wherein determining a first scaling factor comprises determining a scaling index referring to an entry in a table of a plurality of scaling factors; and encoding at least a portion of the picture information includes encoding the scaling index.

In general, at least one example of an embodiment can involve a method as described herein, wherein encoding a scaling index comprises including the scaling index as a syntax element of an encoded bitstream produced by the encoding.

In general, at least one example of an embodiment can involve a method as described herein, wherein encoding a scaling index comprises encoding the scaling index for at least one structural entity.

In general, at least one example of an embodiment can involve a method as described herein, wherein determining a first scaling factor comprises determining a scaling index referring to an entry in a table of a plurality of scaling factors; and decoding at least a portion of picture information is based on the scaling index.

In general, at least one example of an embodiment can involve a method as described herein, wherein determining a scaling index comprises determining the scaling index from a syntax element of an encoded bitstream including the picture information.

In general, at least one example of an embodiment can involve a method as described herein, wherein determining a scaling index comprises determining the scaling index for at least one structural entity.

In general, at least one example of an embodiment can involve a method as described herein, wherein at least one structural entity comprises at least one of a CTU, or a VDPU, or a CU, or a TU, or a slice, or a tile, or a brick, or a quantization group, or a plurality of non-overlapping areas of size Wc*Hc, where Wc and Hc are either pre-defined values or values signaled in the bitstream.

In general, at least one example of an embodiment can involve apparatus as described herein, wherein one or more processors being configured to determine the first scaling factor comprises the one or more processors being further configured to determine a scaling index referring to an entry in a table of a plurality of scaling factors; and wherein the one or more processors being configured to encode at least a portion of picture information comprises the one or more processors being further configured to encode the scaling index.

In general, at least one example of an embodiment can involve apparatus as described herein, wherein one or more processors being configured to encode a scaling index comprises the one or more processors being further configured to include the scaling index as a syntax element of an encoded bitstream produced by the encoding.

In general, at least one example of an embodiment can involve apparatus as described herein, wherein one or more processors being configured to encode a scaling index comprises the one or more processors being further configured to encode the scaling index for at least one structural entity.

In general, at least one example of an embodiment can involve apparatus as described herein, wherein one or more processors being configured to determine a first scaling factor comprises the one or more processors being further configured to determine a scaling index referring to an entry in a table of a plurality of scaling factors; and wherein the one or more processors being further configured to decode at least a portion of picture information based on the scaling index.

In general, at least one example of an embodiment can involve apparatus as described herein, wherein one or more processors are further configured to determine a scaling index from a syntax element of an encoded bitstream including picture information.

In general, at least one example of an embodiment can involve apparatus as described herein, wherein one or more processors being configured to determine a scaling index comprises the one or more processors being configured to determine the scaling index for at least one structural entity.

In general, at least one example of an embodiment can involve apparatus as described herein, wherein at least one structural entity comprises at least one of a CTU, or a VDPU, or a CU, or a TU, or a slice, or a tile, or a brick, or a quantization group, or a plurality of non-overlapping areas of size Wc*Hc, where Wc and Hc are either pre-defined values or values signaled in the bitstream.

In general, at least one example of an embodiment can involve apparatus as described herein, wherein a second scaling factor being determined based on luma information located in a vicinity of chroma information comprises one of an average value of prediction or reconstructed luma samples, collocated with the chroma area, or a median value of prediction or reconstructed luma samples, collocated with the chroma area, or a percentage of the largest values of the prediction or reconstructed luma samples, collocated with the chroma area, or a percentage of the lowest values of the prediction or reconstructed luma samples, collocated with the chroma area.

In general, at least one example of an embodiment can involve a computer program product including instructions, which, when executed by a computer, cause the computer to carry out a method in accordance with one or more examples of embodiments described herein.

In general, at least one example of an embodiment can involve a non-transitory computer readable medium storing executable program instructions to cause a computer executing the instructions to perform a method in accordance with one or more examples of embodiments described herein.

In general, at least one example of an embodiment can involve a signal comprising data generated according to any one or more examples of embodiments described herein.

In general, at least one example of an embodiment can involve a bitstream, formatted to include syntax elements and encoded image information generated in accordance with any one or more of the examples of embodiments described herein.

In general, at least one example of an embodiment can involve a device comprising: an apparatus in accordance with any one or more of the examples of embodiments described herein; and at least one of (i) an antenna configured to receive a signal, the signal including data representative of the image information, (ii) a band limiter configured to limit the received signal to a band of frequencies that includes the data representative of the image information, and (iii) a display configured to display an image from the image information.

In general, at least one example of an embodiment can involve a device as described herein, wherein the device comprises one of a television, a television signal receiver, a set-top box, a gateway device, a mobile device, a cell phone, a tablet, or other electronic device.

Various embodiments have been described. These and other embodiments in accordance with the present disclosure may include any of the following features or entities, alone or in any combination, across various different claim categories and types:

Providing in an encoder and/or decoder for deriving or applying a syntax element indicating a chroma residual scaling index of a chroma block.

Providing in an encoder and/or decoder for deriving or applying a syntax element indicating a chroma residual scaling index of a chroma block, wherein the syntax element can be associated with a structural entity.

Providing in an encoder and/or decoder for deriving or applying a syntax element indicating a chroma residual scaling index of a chroma block, wherein the syntax element can be associated with a structural entity, and wherein the structural entity can be any one of CTU, slice, tile, brick, VDPU, CU, TU, or quantization group.

Providing in an encoder and/or decoder for deriving or applying a syntax element indicating a chroma residual scaling index of a chroma block, wherein the syntax element can be associated with a structural entity, and wherein the syntax element corresponds to an index in a chroma scaling factor table indicating a scaling factor to be applied to a chroma residual of one or more chroma blocks included in the structural entity.

Providing in an encoder and/or decoder for deriving or applying a syntax element indicating a chroma residual scaling index of a chroma block, wherein the syntax element is coded for each structural entity, and wherein the structural entity is a CTU or a VDPU.

Providing in an encoder and/or decoder for deriving or applying a syntax element indicating a chroma residual scaling index of a chroma block, wherein the syntax element is coded for non-overlapping areas of size Wc*Hc, where Wc and Hc are either pre-defined values indicated in the decoder specification, or values signaled at a higher level in the bitstream (e.g. tile, tiles group, slice, PPS, SPS, APS).

Providing in an encoder and/or decoder for deriving or applying a syntax element indicating a chroma residual scaling index of a chroma block, wherein the syntax element is coded at a level that is the same as the delta QP values such as at Quantization Group (QG) level.

Providing in an encoder and/or decoder for deriving or applying a syntax element indicating a chroma residual scaling index of a chroma block, wherein the syntax element is coded at CTU split depth 0 or 1.

Providing in an encoder and/or decoder for deriving or applying a syntax element indicating a chroma residual scaling index of a chroma block, wherein if the top and left chroma blocks neighboring the current chroma block are available, the index can be determined as an average of first and second index value associated with the top and left chroma blocks, respectively.

Providing in an encoder and/or decoder for deriving or applying a syntax element indicating a chroma residual scaling index of a chroma block, wherein if only a top chroma block neighboring the current chroma block is available, the index can be determined as an average of an index value associated with the top chroma block.

Providing in an encoder and/or decoder for deriving or applying a syntax element indicating a chroma residual scaling index of a chroma block, wherein if only a left chroma block neighboring the current chroma block is available, the index can be computed as an average of an index value associated with the left chroma block.

Providing in an encoder and/or decoder for deriving or applying a syntax element indicating a chroma residual scaling index of a chroma block, wherein if none of the top and left chroma blocks neighboring the current chroma block are available, the index can be set to pre-defined value (e.g. 0).

Providing in an encoder and/or decoder for deriving or applying a syntax element indicating a chroma residual scaling index of a chroma block, wherein determining the index can be based on a chroma residual scaling table and one or more redundant values included in the table are removed prior to encoding or decoding the table or prior to encoding or decoding the index values.

Providing in an encoder and/or decoder for deriving or applying a syntax element indicating a chroma residual scaling index of a chroma block, wherein chroma residual scaling can be based on temporal layers.

Providing in an encoder and/or decoder for deriving or applying a syntax element indicating a chroma residual scaling index of a chroma block, wherein the syntax element is added to a prediction value of the scaling factor index.

Providing in an encoder and/or decoder for deriving or applying a syntax element indicating a chroma residual scaling index of a chroma block, wherein the syntax element is added to a prediction value of the scaling factor index, and wherein the prediction value is derived from scaling factor indexes applied to a first area neighboring a second area comprising a current chroma block.

Providing in an encoder and/or decoder for deriving or applying a syntax element indicating a chroma residual scaling index of a chroma block, wherein the syntax element is added to a prediction value of the scaling factor index, and wherein the prediction value is derived from scaling factor indexes applied to a first area neighboring a second area, wherein the second area comprises a current chroma block, and wherein the first and second areas comprise a CTU or QG.

Providing in an encoder and/or decoder for deriving or applying a syntax element indicating a chroma residual scaling index of a chroma block, wherein the syntax element is added to a prediction value of the scaling factor index, and wherein the prediction value is derived from scaling factor indexes applied to a first area neighboring a second area, wherein the second area comprises a current chroma block, and wherein the first and second areas comprise a CTU or QG, and wherein the prediction value for a current CTU or QG is equal to the scaling factor index used for a most recently processed CTU or QG, respectively.

Providing in an encoder and/or decoder for deriving or applying a syntax element indicating a chroma residual scaling index of a chroma block, wherein the syntax element is added to a prediction value of the scaling factor index, and wherein the prediction value for a current chroma block is equal to an average of the scaling factor indexes, or scaling factors derived from those indexes, used for the top and left chroma blocks neighboring the current chroma block.

Providing in an encoder and/or decoder for deriving or applying a syntax element indicating a chroma residual scaling index of a chroma block, wherein the syntax element is added to a prediction value of the scaling factor index, and wherein the prediction value is derived or obtained based on luma values of an area neighboring the area for which a current value of the chroma residual scaling index applies.

Providing in an encoder and/or decoder for deriving or applying a syntax element indicating a chroma residual scaling factor of a chroma block, wherein a value of the chroma residual scaling factor equals a signed integer value relative to a neutral value.

Providing in an encoder and/or decoder for deriving or applying a syntax element indicating a delta QP having a granularity varying based on a parameter.

Providing in an encoder and/or decoder for deriving or applying a syntax element indicating a delta QP having a granularity varying based on a parameter, wherein the parameter value is selected to provide a granularity finer than 12% of a neutral value.

Providing in an encoder and/or decoder for deriving or applying a syntax element indicating a delta QP having a granularity varying based on a parameter, wherein the granularity is modified to produce a finer granularity only for a chroma component, thereby providing a modified chroma delta QP.

Providing in an encoder and/or decoder for deriving or applying a syntax element indicating a delta QP having a granularity varying based on a parameter, wherein the granularity is modified to produce a finer granularity only for a chroma component, thereby providing a modified chroma delta QP, and wherein the modified chroma delta QP is used to derive a scaling factor applied to one or more chroma residual samples.

Providing in an encoder and/or decoder for deriving or applying a syntax element indicating a delta QP having a granularity varying based on a parameter, wherein the granularity is modified to produce a finer granularity for a chroma component, thereby providing a modified chroma delta QP, and wherein the modified chroma delta QP is used for performing an inverse quantizing of chroma residual transform coefficients, thereby providing a chroma quantization parameter having a finer granularity.

Providing in an encoder and/or decoder for deriving or applying first and second syntax elements, wherein the first syntax element indicates a chroma delta QP, the second syntax element indicates a refinement value, and the refinement value provides for modifying a granularity of the chroma delta QP.

Providing in an encoder for deriving a chroma residual scaling factor index or delta QP value for a chroma block based on luma samples collocated with the chroma block, or collocated with chroma samples located in a neighborhood of a chroma structural entity for which the chroma residual scaling factor index or chroma delta QP value applies.

Providing in an encoder for deriving a chroma residual scaling factor index or delta QP value for a chroma block based on luma samples collocated with the chroma block, or collocated with chroma samples located in a neighborhood of a chroma structural entity for which the chroma residual scaling factor index or chroma delta QP value applies, wherein the chroma structural entity comprises a CTU or quantization group (QG).

Providing in an encoder for deriving or obtaining a chroma residual scaling factor index or chroma dQP derived from or based on an average value of the prediction or reconstructed luma samples, collocated with the chroma area.

Providing in an encoder for deriving or obtaining a chroma residual scaling factor index or chroma dQP derived from or based on a median value of the prediction or reconstructed luma samples, collocated with the chroma area.

Providing in an encoder for deriving or obtaining a chroma residual scaling factor index or chroma dQP derived from or based on a percentage of largest values of predicted or reconstructed luma samples, collocated with the chroma area.

Providing in an encoder for deriving or obtaining a chroma residual scaling factor index or chroma dQP derived from or based on a percentage of largest values of predicted or reconstructed luma samples, collocated with the chroma area, wherein the percentage is 10.

Providing in an encoder for deriving or obtaining a chroma residual scaling factor index or chroma dQP derived from or based on a percentage of lowest values of predicted or reconstructed luma samples, collocated with the chroma area.

Providing in an encoder for deriving or obtaining a chroma residual scaling factor index or chroma dQP derived from or based on a percentage of lowest values of predicted or reconstructed luma samples, collocated with the chroma area, wherein the percentage is 10.

Providing an encoder and/or decoder for processing video in accordance with any of the embodiments, features or entities, alone or in any combination, as described herein based on providing reduced complexity and/or improved compression efficiency.

Inserting in the signaling syntax elements that enable the encoder and/or decoder to provide encoding and/or decoding in accordance with any of the embodiments, features or entities, alone or in any combination, as described herein.

Selecting, based on these syntax elements, the features or entities, alone or in any combination, as described herein to apply at the decoder.

A bitstream or signal that includes one or more of the described syntax elements, or variations thereof.

Inserting in the signaling syntax elements that enable the decoder to provide decoding in a manner corresponding to the manner of encoding used by an encoder.

Creating and/or transmitting and/or receiving and/or decoding a bitstream or signal that includes one or more of the described syntax elements, or variations thereof.

A TV, set-top box, cell phone, tablet, or other electronic device that provides for applying encoding and/or decoding according to any of the embodiments, features or entities, alone or in any combination, as described herein.

A TV, set-top box, cell phone, tablet, or other electronic device that performs encoding and/or decoding according to any of the embodiments, features or entities, alone or in any combination, as described herein, and that displays (e.g. using a monitor, screen, or other type of display) a resulting image.

- A TV, set-top box, cell phone, tablet, or other electronic device that tunes (e.g. using a tuner) a channel to receive a signal including an encoded image, and performs encoding and/or decoding according to any of the embodiments, features or entities, alone or in any combination, as described herein.
- A TV, set-top box, cell phone, tablet, or other electronic device that receives (e.g. using an antenna) a signal over the air that includes an encoded image, and performs encoding and/or decoding according to any of the embodiments, features or entities, alone or in any combination, as described herein.
- A computer program product storing program code that, when executed by a computer encoding and/or decoding in accordance with any of the embodiments, features or entities, alone or in any combination, as described herein.
- A non-transitory computer readable medium including executable program instructions causing a computer executing the instructions to implement encoding and/or decoding in accordance with any of the embodiments, features or entities, alone or in any combination, as described herein.

Various other generalized, as well as particularized embodiments are also supported and contemplated throughout this disclosure.

APPENDIX—EXAMPLE OF SYNTAX 7.3.5 Slice Header Syntax
7.3.5.1 General Slice Header Syntax

|  | Descriptor |
| --- | --- |
| slice_header( ) { |  |
|   slice_pic_parameter_set_id | ue(v) |
|   ... |  |
|   if( sps_lmcs_enabled_flag ) { |  |
|     slice_lmcs_enabled_flag | u(1) |
|     if( slice_lmcs_enabled_flag ) { |  |
|       slice_lmcs_aps_id | u(5) |
|       slice_chroma_residual_scale_flag | u(1) |
|       if( slice_chroma_residual_scale_flag ) |  |
|         slice_chroma_residual_scale_grain_minus1 |  |
|   } |  |
|   if ( entropy_coding_sync_enabled_flag ) |  |
|     num_entry_point_offsets | ue(v) |
|   if( NumEntryPoints > 0 ) { |  |
|     offset_len_minus1 | ue(v) |
|     for( i = 0; i < NumEntryPoints; i++ ) |  |
|       entry_point_offset_minus1[ i ] | u(v) |
|   } |  |
|   byte_alignment( ) |  |
| } |  |

7.3.7.2 Coding Tree Unit Syntax

|  | Descriptor |
| --- | --- |
| coding_tree_unit( ) { |  |
|   xCtb = ( CtbAddrInRs % PicWidthInCtbsY ) << CtbLog2SizeY |  |
|   yCtb = ( CtbAddrInRs / PicWidthInCtbsY ) << CtbLog2SizeY |  |
|   if( slice_sao_luma_flag \|\| slice_sao_chroma_flag ) |  |
|     sao( xCtb >> CtbLog2SizeY, yCtb >> CtbLog2SizeY ) |  |
|   if( slice_alf_enabled_flag ){ |  |
|     alf_ctb_flag[ 0 ][ xCtb >> Log2CtbSize ][ yCtb >> Log2CtbSize ] | ae(v) |
|     if( alf_ctb_flag[ 0 ][ xCtb >> Log2CtbSize ][ yCtb >> Log2CtbSize ] ) { |  |
|       if( slice_num_alf_aps_ids_luma > 0) |  |
|         alf_ctb_use_first_aps_flag | ae(v) |
|       if( !alf_ctb_use_first_aps_flag ) { |  |
|         if( slice_num_alf_aps_ids_luma > 1 ) |  |
|           alf_use_aps_flag | ae(v) |
|         if( alf_use_aps_flag ) |  |
|           alf_luma_prev_filter_idx_minus1 | ae(v) |
|         else |  |
|           alf_luma_fixed_filter_idx | ae(v) |
|       } |  |
|     } |  |
|     if( slice_alf_chroma_idc = = 1 \|\| slice_alf_chroma_idc = = 3 ) |  |
|       alf_ctb_flag[ 1 ][ xCtb >> Log2CtbSize ][ yCtb >> Log2CtbSize ] | ae(v) |
|     if( slice_alf_chroma_idc = = 2 \|\| slice_alf_chroma_idc = = 3 ) |  |
|       alf_ctb_flag[ 2 ][ xCtb >> Log2CtbSize ][ yCtb >> Log2CtbSize ] | ae(v) |
|   } |  |
|   if( slice_chroma_residual_scale_flag ) { |  |
|     if ( ( ( (xCtb >> Log2CtbSize ) % ChResScalGrain = = 0 && |  |
|       ( yCtb >> Log2CtbSize ) % ChResScalGrain = = 0 ) \|\| |  |
|       ( CtbAddrInBs = = CtbAddrInRs ) ) { |  |
|       cu_crs_delta_abs | ae(v) |
|       if( cu_crs_delta_abs ) |  |
|         cu_crs_delta_sign_flag | ae(v) |
|     } |  |
|   } |  |
|   if( slice_type = = I && qtbtt_dual_tree_intra_flag ) |  |
|     dual_tree_implicit_qt_split ( xCtb, yCtb, CtbSizeY, 0 ) |  |
|   else |  |
|     coding_tree( xCtb, yCtb, CtbSizeY, CtbSizeY, 1, 0, 0, 0, 0, 0, SINGLE_TREE ) |  |
| } |  |

In the VTM5.0 the concept of brick is specified. A picture can be divided into non-overlapping rectangular bricks, themselves made of CTUs. In principle, it is expected that there is no dependency between neighboring bricks. According to the following conditions of the above table

```
if ( ( ( xCtb >> Log2CtbSize ) % ChResScalGrain = = 0 &&
   ( yCtb >> Log2CtbSize ) % ChResScalGrain = = 0 ) ||
   ( CtbAddrInBs 5 = = CtbAddrInRs ) ) {
the syntax elements cu_crs_delta_abs and cu_crs_delta_sign_flag are
signalled only when the CTU is the first one of a non-overlapping area
of NxN CTUs, N being equal to ChResScalGrain, or when the CTU is
the first one of a brick. This last test can done thanks to the following
condition:
   CtbAddrInBs = = CtbAddrInRs
where CtbAddrInBs can be the address in the picture of the first CTU
of the current brick, and CtbAddrInRs can be the address in the picture
of the current CTU.
```

7.4.6.1 General Slice Header Semantics

When present, the value of each of the slice header syntax elements slice_pic_parameter_set_id, slice_pic_order_cnt_lsb, and slice_temporal_mvp_enabled_flag shall be the same in all slice headers of a coded picture.

. . .

slice_chroma_residual_scale_flag equal to 1 specifies that chroma residual scaling is enabled for the current slice. slice_chroma_residual_scale_flag equal to 0 specifies that chroma residual scaling is not enabled for the current slice. When slice_chroma_residual_scale_flag is not present, it is inferred to be equal to 0.

slice_chroma_residual_scale_grain_minus1 specifies the granularity in CTU size for signalling the chroma residual scaling index. When slice_chroma_residual_scale_grain_minus1 is not present, it is inferred to be equal to 1. When slice_chroma_residual_scale_grain_minus1 is not present, it is inferred to be equal to 0, and the variable ChResScalGrain is set equal to 1.

When slice_chroma_residual_scale_grain_minus1 is present, the variable CuCrsDeltaVal is derived as follows:

ChResScalGrain=slice_chroma_residual_scale_grain_minus1+1 num_entry_point_offsets is used to specify the variable NumEntryPoints, which specifies the number of entry points in the current slice as follows:

. . .

7.4.6.4 Luma Mapping with Chroma Scaling Data Semantics lmcs_min_bin_idx specifies the minimum bin index used in the luma mapping with chroma scaling construction process. The value of lmcs_min_bin_idx shall be in the range of 0 to 15, inclusive.

. . .

The variable ChromaScaleCoeff[i], with i=0 . . . 15, is derived as follows:

```
if ( lmcsCW[ i ] = = 0 ) ChromaScaleCoeff[ i ] is set equal
to (1 << 11)
   Otherwise the following applies.
ChromaScaleCoeff [ 0 ] = InvScaleCoeff [ 0 ]
idx = 1
for( i = 0; i <= 15; i++ ) {
   remove = 0
   for (j = 0; j < idx; j++)
      if ( ChromaScaleCoeff [i] == InvScaleCoeff [j])
         remove = 1
```

```
   if ( remove = = 0 )
      ChromaScaleCoeff [idx++] = InvScaleCoeff [i]
}
```

7.4.8.2 Coding Tree Unit Semantics

The CTU is the root node of the coding tree structure.

The array IsInSmr[x][y] specifying whether the sample at (x,y) is located inside a shared merging candidate list region, is initialized as follows for x=0 . . . CtbSizeY−1 and y=0 . . . CtbSizeY−1:

$$IsInSmr[x][y]=\text{FALSE} \quad (7\text{-}125)$$

alf_ctb_flag[cIdx][xCtb>>Log 2CtbSize][yCtb>>Log 2CtbSize] equal to 1 specifies that the adaptive loop filter is applied to the coding tree block of the colour component indicated by cIdx of the coding tree unit at luma location (xCtb, yCtb). alf_ctb_flag[cIdx][xCtb>>Log 2CtbSize][yCtb>>Log 2CtbSize] equal to 0 specifies that the adaptive loop filter is not applied to the coding tree block of the colour component indicated by cIdx of the coding tree unit at luma location (xCtb, yCtb).

When alf_ctb_flag[cIdx][xCtb>>Log 2CtbSize][yCtb>>Log 2CtbSize] is not present, it is inferred to be equal to 0.

cu_crs_delta_abs specifies the absolute value of the difference CuCrsDeltaVal between the chroma residual scaling index of the current coding unit and its prediction.

cu_crs_delta_sign_flag specifies the sign of CuCrsDeltaVal as follows:

If cu_crs_delta_sign_flag is equal to 0, the corresponding CuCrsDeltaVal has a positive value.
   Otherwise (cu_crs_delta_sign_flag is equal to 1), the corresponding CuCrsDeltaVal has a negative value.

When cu_crs_delta_sign_flag is not present, it is inferred to be equal to 0.

When cu_crs_delta_abs is present, the variable CuCrsDeltaVal is derived as follows:

$$\text{CuCrsDeltaVal}=cu\_crs\_\text{delta\_abs}*(1-2*cu\_crs\_\text{delta\_sign\_flag}) \quad (7\text{-}159)$$

. . .

8.7.5.3 Picture Reconstruction with Luma Dependent Chroma Residual Scaling Process for Chroma Samples Inputs to this process are:
   a location (xCurr, yCurr) of the top-left sample of the current transform block relative to the top-left sample of the current picture,
   a variable nCurrSw specifying the transform block width,
   a variable nCurrSh specifying the transform block height,
   a variable tuCbfChroma specifying the coded block flag of the current chroma transform block,
   an (nCurrSw)×(nCurrSh) array predSamples specifying the chroma prediction samples of the current block,
   an (nCurrSw)×(nCurrSh) array resSamples specifying the chroma residual samples of the current block.

Output of this process is a reconstructed chroma picture sample array recSamples. The reconstructed chroma picture sample recSamples is derived as follows for i=0 . . . nCurrSw−1, j=0 . . . nCurrSh−1:

If one of the following conditions is true, recSamples[xCurr+i][yCurr+j] is set equal to Clip1$_C$(predSamples[i][j]+resSamples[i][j]):
   slice_chroma_residual_scale_flag is equal to 0
   nCurrSw*nCurrSh is less than or equal to 4
   tu_cbf_cb [xCurr][yCurr] is equal to 0 and tu_cbf_cr [xCurr][yCurr] is equal to 0

Otherwise, the following applies:
The variable varScale is derived by invoking the derivation process for chroma residual scaling factors as specified in clause 8.8.2.4.
The recSamples is derived as follows:
If tuCbfChroma is equal to 1, the following applies:

resSamples[$i$][$j$]=Clip3(−(1<<BitDepth$_C$),(1<<Bit-
Depth$_C$)−1,resSamples[$i$][$j$])  (8-1013)

recSamples[xCurr+$i$][yCurr+$j$]=Clip1$_C$(predSamples
[$i$][$j$]+Sign(resSamples[$i$][$j$])*((Abs(resSamples
[$i$][$j$])*varScale+(1<<10))>>11))  (8-1014)

Otherwise (tu_cbf is equal to 0), the following applies:

recSamples[xCurr+$i$][yCurr+$j$]=Clip1$_C$(predSamples
[$i$][$j$])  (8-1015)

8.8.2.4 Derivation Process for Chroma Residual Scaling Factors
Inputs to this process are:
a location (xCTU, yCTU) specifying the location of the current CTU of the current picture, in CTU size.
In this process, the chroma residual scaling factor chrResScalFactor[xCTU][yCTU] of the current CTU is derived.
The predicted parameter crsf_pred is derived as follows:
If one or more of the following conditions are true, crsf_pred is set equal to 0:
The current CTU is the first CTU in a slice.
The current CTU is the first CTU in a brick.
Otherwise, crsf_pred is derived as follows.
nbPred is set to 0.
If (xCTU, yCTU−1) is inside the current slice and inside the current brick, the following applies crsf_pred=chrResScalFactor[xCTU][yCTU−1]

nbPred=nbPred+1

If (xCTU−1, yCTU) is inside the current slice and inside the current brick, the following applies crsf_pred=crsf_pred+chrResScalFactor[xCTU−1]
[yCTU]

nbPred=nbPred+1 crsf_pred is set to equal to (crsf_pred+(nbPred>>1))>>nbPred.
chrResScalFactor[xCTU][yCTU] is derived as follows:
If (xCTU % ChResScalGrain)==0 and (yCTU % ChResScalGrain)==0, chrResScalFactor[xCTU][yCTU] is derived as follows:
chrResScalFactor[xCTU][yCTU]=crsf_pred+CuCrsDeltaVal
Otherwise, chrResScalFactor[xCTU][yCTU] is derived as follows:
xCTUref is set equal to (ChResScalGrain*(xCTU/ChResScalGrain))
yCTUref is set equal to (ChResScalGrain*(yCTU/ChResScalGrain))
chrResScalFactor[xCTU][yCTU] is set equal to chrResScalFactor[xCTUref][yCTUref]

The invention claimed is:

1. A method for encoding picture information, the method comprising:
determining a first scaling factor varying with a first granularity to scale a chroma prediction residual associated with chroma information included in the picture information;
determining a second scaling factor varying with a second granularity finer than the first granularity;
scaling the chroma prediction residual based on a combination of the first scaling factor and the second scaling factor to provide a scaled chroma prediction residual with the second granularity; and
encoding at least a portion of the picture information based on the scaled chroma prediction residual.

2. The method of claim 1, wherein the second scaling factor is determined based on luma information included in the picture information and located in a vicinity of the chroma information;
determining the first scaling factor comprises determining a scaling index referring to an entry in a table of a plurality of scaling factors; and
encoding the at least a portion of the picture information includes encoding the scaling index.

3. The method of claim 2, wherein encoding the scaling index comprises including the scaling index as a syntax element of an encoded bitstream produced by the encoding.

4. The method of claim 2, wherein encoding the scaling index comprises encoding the scaling index for at least one structural entity.

5. A method for decoding picture information, the method comprising:
determining a first scaling factor varying with a first granularity to scale a chroma prediction residual associated with chroma information included in the picture information;
determining a second scaling factor varying with a second granularity finer than the first granularity;
scaling the chroma prediction residual based on a combination of the first scaling factor and the second scaling factor to provide a scaled chroma prediction residual with the second granularity; and
decoding at least a portion of the picture information based on the scaled chroma prediction residual.

6. The method of claim 5, wherein the second scaling factor is determined based on luma information included in the picture information and located in a vicinity of the chroma information;
determining the first scaling factor comprises determining a scaling index referring to an entry in a table of a plurality of scaling factors; and
decoding the at least a portion of the picture information is based on the scaling index.

7. The method of claim 6, wherein determining the scaling index comprises determining the scaling index from a syntax element of an encoded bitstream including the picture information.

8. The method of claim 6, wherein determining the scaling index comprises determining the scaling index for at least one structural entity.

9. The method of claim 8, wherein the at least one structural entity comprises at least one of a CTU, or a VDPU, or a CU, or a TU, or a slice, or a tile, or a brick, or a quantization group, or a plurality of non-overlapping areas of size Wc*Hc, where Wc and Hc are either pre-defined values or values signaled in the bitstream.

10. The method of claim 6, wherein the second scaling factor being determined based on luma information located in a vicinity of the chroma information comprises one of
a. an average value of prediction or reconstructed luma samples, collocated with the chroma area, or
b. a median value of prediction or reconstructed luma samples, collocated with the chroma area, or
c. a percentage of the largest values of the prediction or reconstructed luma samples, collocated with the chroma area, or d. a percentage of the lowest values of the prediction or reconstructed luma samples, collocated with the chroma area.

11. A non-transitory computer readable medium storing executable program instructions to cause a computer executing the instructions to perform a method according to claim 5.

12. Apparatus for encoding picture information comprising:
one or more processors configured to
determine a first scaling factor varying with a first granularity to scale a chroma prediction residual associated with chroma information included in the picture information;
determine a second scaling factor varying with a second granularity finer than the first granularity;
scale the chroma prediction residual based on a combination of the first scaling factor and the second scaling factor to provide a scaled chroma prediction residual with the second granularity; and
encode at least a portion of the picture information based on the scaled chroma prediction residual.

13. The apparatus of claim 12, wherein the one or more processors are further configured to
determine the second scaling factor based on luma information included in the picture information and located in a vicinity of the chroma information; and
determine a scaling index referring to an entry in a table of a plurality of scaling factors; and
encode the scaling index.

14. The apparatus of claim 13, wherein the one or more processors being configured to encode the scaling index comprises the one or more processors being further configured to include the scaling index as a syntax element of an encoded bitstream produced by the encoding.

15. The apparatus of claim 13, wherein the one or more processors being configured to encode the scaling index comprises the one or more processors being further configured to encode the scaling index for at least one structural entity.

16. Apparatus for decoding picture information comprising:
one or more processors configured to
determine a first scaling factor varying with a first granularity to scale a chroma prediction residual associated with chroma information included in the picture information;
determine a second scaling factor varying with a second granularity finer than the first granularity;
scale the chroma prediction residual based on a combination of the first scaling factor and the second scaling factor to provide a scaled chroma prediction residual with the second granularity; and
decode at least a portion of the picture information based on the scaled chroma prediction residual.

17. The apparatus of claim 16, wherein the one or more processors are further configured to
determine the second scaling factor based on luma information included in the picture information and located in a vicinity of the chroma information; and
determine a scaling index referring to an entry in a table of a plurality of scaling factors; and decode the at least a portion of the picture information based on the scaling index.

18. The apparatus of claim 17, wherein the one or more processors are further configured to determine the scaling index from a syntax element of an encoded bitstream including the picture information.

19. The apparatus of claim 17, wherein the one or more processors being configured to determine the scaling index comprises the one or more processors being configured to determine the scaling index for at least one structural entity.

20. The apparatus of claim 19, wherein the at least one structural entity comprises at least one of a CTU, or a VDPU, or a CU, or a TU, or a slice, or a tile, or a brick, or a quantization group, or a plurality of non-overlapping areas of size Wc*Hc, where Wc and Hc are either pre-defined values or values signaled in the bitstream.

21. The apparatus of claim 17, wherein the second scaling factor being determined based on luma information located in a vicinity of the chroma information comprises one of
a. an average value of prediction or reconstructed luma samples, collocated with the chroma area, or
b. a median value of prediction or reconstructed luma samples, collocated with the chroma area, or
c. a percentage of the largest values of the prediction or reconstructed luma samples, collocated with the chroma area, or
d. a percentage of the lowest values of the prediction or reconstructed luma samples, collocated with the chroma area.

22. The apparatus of claim 16, further comprising at least one of (i) an antenna configured to receive a signal, the signal including data representative of the image information, (ii) a band limiter configured to limit the received signal to a band of frequencies that includes the data representative of the image information, and (iii) a display configured to display an image from the image information.

23. The apparatus of claim 22, wherein the apparatus comprises one of a television, a television signal receiver, a set-top box, a gateway device, a mobile device, a cell phone, a tablet, or other electronic device.

* * * * *